US010169777B2

(12) United States Patent
Zhou et al.

(10) Patent No.: US 10,169,777 B2
(45) Date of Patent: Jan. 1, 2019

(54) SYSTEMS AND METHODS FOR SCORING INTERNET ADS AND RANKING VENDORS

(71) Applicant: Excalibur IP, LLC, New York, NY (US)

(72) Inventors: Yan Zhou, San Jose, CA (US); Anupam Aggarwal, Sunnyvale, CA (US); Kranthi Kode, Standford, CA (US); Pradhan G. Panttankayak, San Jose, CA (US)

(73) Assignee: EXCALIBUR IP, LLC, New York, NY (US)

( * ) Notice: Subject to any disclaimer, the term of this patent is extended or adjusted under 35 U.S.C. 154(b) by 279 days.

(21) Appl. No.: 13/908,775

(22) Filed: Jun. 3, 2013

(65) Prior Publication Data

US 2013/0268348 A1 Oct. 10, 2013

Related U.S. Application Data

(63) Continuation of application No. 13/017,776, filed on Jan. 31, 2011, now abandoned.

(51) Int. Cl.
*G06Q 30/00* (2012.01)
*G06Q 30/02* (2012.01)

(52) U.S. Cl.
CPC ..... *G06Q 30/0244* (2013.01); *G06Q 30/0241* (2013.01); *G06Q 30/0242* (2013.01); *G06Q 30/0282* (2013.01)

(58) Field of Classification Search
USPC ..................................................... 705/14.41
See application file for complete search history.

(56) References Cited

U.S. PATENT DOCUMENTS

| 8,553,540 | B2* | 10/2013 | Mehrotra | H04L 47/30 370/230 |
|---|---|---|---|---|
| 2004/0236721 | A1* | 11/2004 | Pollack | G06F 17/30699 |
| 2007/0179845 | A1* | 8/2007 | Jain | 705/14 |
| 2008/0109285 | A1* | 5/2008 | Reuther | G06F 17/30864 705/7.11 |
| 2009/0048925 | A1* | 2/2009 | Song et al. | 705/14 |
| 2009/0259540 | A1* | 10/2009 | Phan | G06Q 30/02 705/14.4 |
| 2009/0327083 | A1* | 12/2009 | Mathew | G06Q 30/02 705/14.69 |
| 2012/0078707 | A1* | 3/2012 | Ramakrishnan | G06Q 30/0242 705/14.41 |

OTHER PUBLICATIONS

What is Latency, Feb. 11, 2010, www.webopedia.com, printed through www.archive.org, date is in the URL in YYYYMMDD format.*
6 034 Quiz 3, MIT, Nov. 10, 2010, printed from "https://ocw.mit.edu/courses/electrical-engineering-and-computer-science/6-034-artificial-intelligence-fall-2010/exams/MIT6_034F10_quiz3_2010.pdf ".*
Office Action for U.S. Appl. No. 13/017,776 dated Dec. 19, 2012, 8 pages.

* cited by examiner

*Primary Examiner* — Jamie Kucab
(74) *Attorney, Agent, or Firm* — Brinks Gilson & Lione

(57) ABSTRACT

Computer-implemented systems and method are taught for scoring an internet ad and/or ranking a vendor based on a combination of quantitative and qualitative characteristics.

20 Claims, 12 Drawing Sheets

SYSTEMS AND METHODS FOR SCORING INTERNET ADS AND RANKING VENDORS

RELATED APPLICATIONS

The present application is a continuation of U.S. patent application Ser. No. 13/017,776 (still pending), filed Jan. 31, 2011, the entirety of which is hereby incorporated by reference.

BACKGROUND

The exploding popularity and sophistication of the internet has brought to bear easy access for anyone or any entity to publish, consume and aggregate content. Along with an explosion of content, the rate of appearance of advertisements that accompany content (and serve to monetize the content) is growing at a similar pace. Internet advertising supports a large and sophisticated ecosystem of participants including publishers, content providers, ad networks, ad agencies, ad aggregators, and ad arbitragers.

Within this ecosystem, about 70% of the advertising is served by third-party ecosystem of participants. Substantially all of the participants in the ecosystem desire to see steps taken to protect the user experience. Some techniques exist for monitoring performance and for reporting poor performance with the intent of reacting to poor performance (e.g. via policing actions or via corrective actions). In some cases, measured performance below a certain threshold drives business logic modules, which in turn are configured to recommend or implement such policing or remedial actions. In some cases such actions include automated real-time alerting components. During the performance monitoring, the aforementioned business logic modules collect measurements related to the advertisements (e.g. latency, click-through, quality etc). Some or all of the measurements can be used to score the advertisers, publishers, content providers, ad networks, ad agencies, ad aggregators, ad arbitragers, and other ecosystem participants. Such a score can be used to rank the participants relative to other participants, and such a ranking can be used by the advertising community at large to build reputations.

Some of the scoring criterion is quantitative in nature. Other scoring criterion is qualitative in nature. Yet, techniques are needed to reliably combine quantitative and qualitative characteristics of the advertising such that the score contribution from one score constituent (e.g. a quantitative measure) does not unfairly eclipse the score contribution from a different score constituent (e.g. a quality measure). As regards quantitative measurements, some of the participants are more technologically savvy than others, and understand the inner workings of an ad network. In contrast, some of the participants have more marketing savvy than others, but do not necessarily understand the inner workings of ad placement. Highly effective internet advertising demands high scoring from the network. (e.g. based on quantitative measures) as well as high scoring from the user population and/or from editorial staff (e.g. based on subjective, qualitative measures). However, in some situations, these measures may counteract one another. For example, qualitatively higher-scoring advertisements (e.g. using video, animations, pop-ups, dynamically assembled targeted ad content, etc) might demand ad network resources to such an extent that the user experience suffers (e.g. from low-scores in quantitative criterion).

Participants involved in delivering third-party advertising need to be ranked in order to protect the user experience. Although there exist techniques for scoring against quantitative criterion, and although there exist techniques for recognizing qualitative criterion, it remains to meaningfully combine scores from such quantitative and qualitative criterion. For this reason and other reasons, there exists a need for ranking vendors by combining quantitative and qualitative characteristics of third-party advertising.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE DRAWINGS

Figure 1:
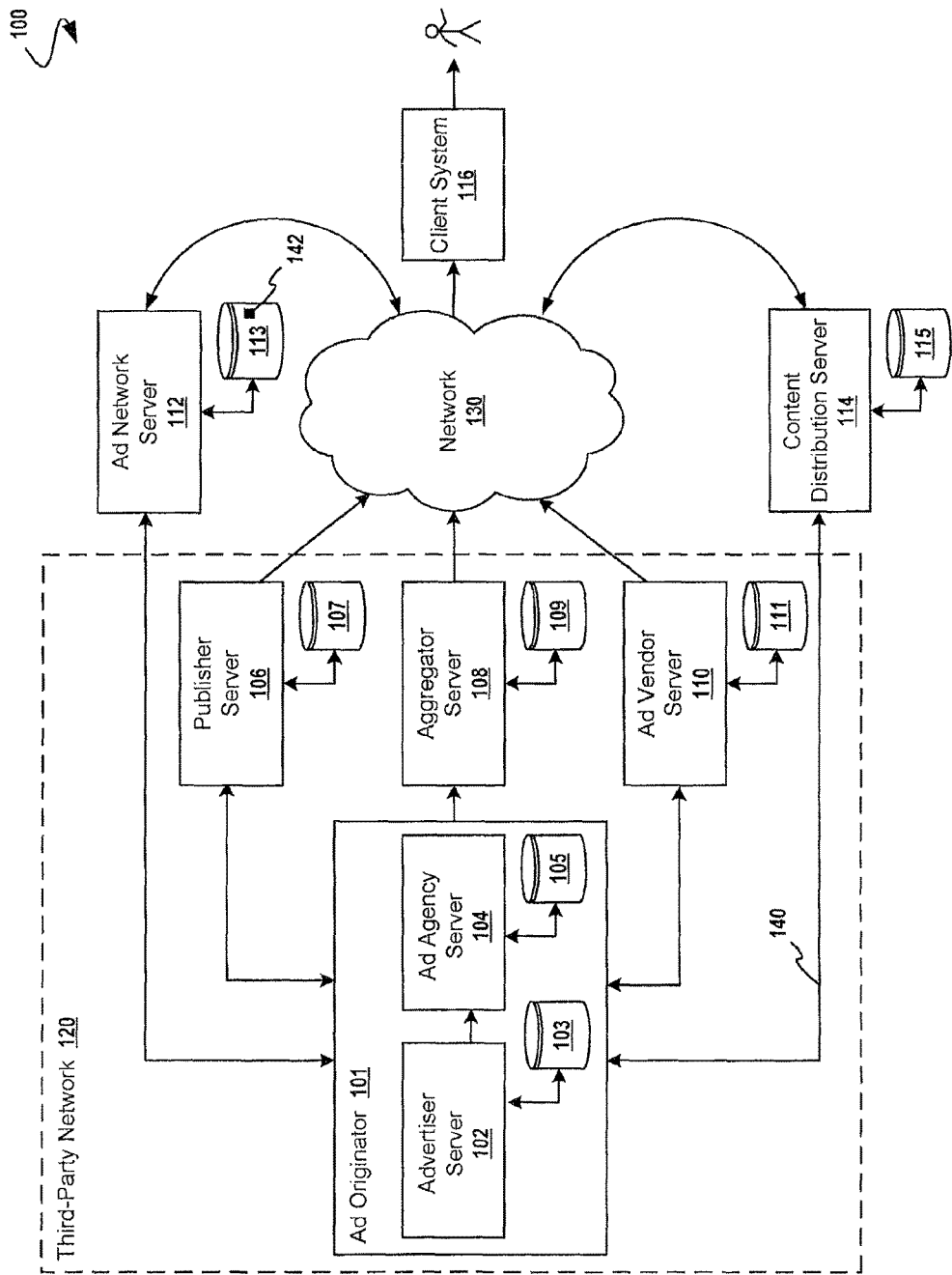
FIG. 1 depicts an internet ad ecosystem for serving content and inline advertisements including an ad network server, a content distribution server, and a third-party network of servers, according to an exemplary embodiment.

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

DEFINITIONS

Some terms are defined below in alphabetical order for easy reference. These terms are not rigidly restricted to these definitions. A term may be further defined by the term's use in other sections of this description.

"Ad" (e.g. ad, item and/or message) means a paid announcement, as of goods or services for sale, preferably on a network, such as the internet. An ad may also be referred to as an ad, an item and/or a message.

"Ad call" means a message, sent by a computer to an ad server for requesting an ad to be displayed.

"Ad click-through rate" (e.g. click-through rate, CTR) means a measurement of ad clicks per a period of time.

"Ad code" means the HTML or other markup language description that describes an advertisement or message in such a manner as can be parsed by a browser. Ad code may include references to other ad code. Ad code may mean any subset, or portion or segment of ad code that describes an advertisement or message in such a manner as can be parsed by a browser.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc) means an entity that is in the business of marketing a product and/or a service to users. An advertiser may include without limitation a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device, such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Coupon" (e.g. coupon ad) means a portion of a certificate, ticket, label, ad or the like set off from the main body by dotted lines or the like to emphasize its separability, entitling the holder to something, such as a gift or discount, or for use as an order blank or a contest entry form, etc. A coupon is designed in a convenient format for a user to "take" the coupon to a seller to receive an advertised benefit.

"Database" (e.g. database system, etc) means a collection of data organized in such a way that a computer program may quickly select desired pieces of the data. A database is an electronic filing system. In some instances, the term "database" is used as shorthand for "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include without limitation a software application such as Microsoft Word™, a laptop computer, a database, a server, a display, a computer mouse and/or a hard disk.

"Impression" (e.g. ad impression) means a delivery of an ad to a user device for viewing by a user.

"Item" means an ad, which is defined above.

"Marketplace" means a world of commercial activity where products and/or services are browsed, bought and/or sold, etc. A marketplace may be located over a network, such as the internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks, including without limitation the internet, a local area network, a wide area network, a wireless network, and/or a cellular network.

"Publisher" means an entity that publishes, on a network, a web page having content and/or ads, etc.

"Server" means a software application that provides services to other computer programs (and their users), in the same computer or another computer. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Social network" means a networked software application having user accounts (e.g. nodes) that are coupled by using one or more interdependencies such as, for example, friendship, kinship, common interest, financial exchange, dislike, sexual relationship, beliefs, knowledge and/or prestige. Examples of a social network include without limitation Facebook™, Twitter™, Myspace™ Delicious™, Digg™, and/or Stumble Upon™.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include without limitation Object Pascal, C, C++ and/or Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User" (e.g. consumer, etc) means an operator of a user device. A user is typically a person who seeks to acquire a product and/or service. For example, a user may be a woman who is browsing Yahoo!™ Shopping for a new cell phone to replace her current cell phone. The term "user" may refer to a user device, depending on the context.

"User device" (e.g. computer, user computer, client and/or server, etc) means a single computer or a network of interacting computers. A user device is a computer that a user may use to communicate with other devices over a network, such as the internet. A user device is a combination of a hardware system, a software operating system, and perhaps one or more software application programs. Examples of a user device include without limitation a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems Workstation having a UNIX operating system.

"Web browser" means a software program that may display text, graphics, or both, from web pages on websites. Examples of a web browser include without limitation Mozilla Firefox™ and Microsoft Internet Explorer™

"Web page" means documents written in a mark-up language including without limitation HTML (hypertext mark-up language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (Uniform Resource Locator).

"Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one web page to a web browser. An example of a web server is a Yahoo!™ web server. A server is defined above.

"Website" means one or more web pages. A website preferably includes a plurality of web pages virtually connected to form a coherent group.

Introduction

The exploding popularity and sophistication of the internet has brought to bear easy access for anyone or any entity to publish, consume and aggregate content. Along with an explosion of content, the rate of appearance of advertisements that accompany content (and serve to monetize the content) is growing at a similar pace. Internet advertising supports a large and sophisticated ecosystem of participants including publishers, content providers, ad networks, ad agencies, ad aggregators, and ad arbitragers.

Within this ecosystem, about 70% of the advertising is served by third-party ecosystem participants. Substantially all of the participants in the ecosystem desire to see steps taken to protect the user experience. Some techniques exist for monitoring performance and for reporting poor performance with the intent of reacting to poor performance (e.g. via policing actions or via corrective actions). In some cases, measured performance below a certain threshold drives business logic modules, which in turn are configured to recommend or implement such policing or remedial actions. In some cases such actions include automated real-time alerting components. During the performance monitoring, the aforementioned business logic modules collect measurements related to the advertisements (e.g. latency, timeout, quality, click-through, etc). Some or all of the measurements can be used to score the advertisers, publishers, content providers, ad networks, ad agencies, ad aggregators, ad arbitragers, and other ecosystem participants. Such a score can be used to rank the participants relative to other participants, and such a ranking can be used by the advertising community at large to build reputations.

Some of the scoring criterion is quantitative in nature. Other scoring criterion is qualitative in nature. Yet, techniques are needed to reliably combine quantitative and qualitative characteristics of the advertising.

As regards quantitative measurements, some of the participants are more technologically savvy than others, and understand the inner workings of an ad network. In contrast, some of the participants have more marketing savvy than others, but do not necessarily understand the inner workings of ad placement. Highly effective internet advertising demands high scoring from the network. (e.g. based on quantitative measures) as well as high scoring from the user population (e.g. based on subjective, qualitative measures). However, in some situations, qualitatively higher-scoring advertisements (e.g. using video, animations, pop-ups, dynamically assembled targeted ad content, etc) might demand ad network resources to such an extent that the user experience suffers (e.g. from low scores in quantitative criterion).

Participants involved in delivering third-party advertising need to be ranked in order to protect the user experience. Although there exist techniques for scoring against quantitative criterion, and although there exist techniques for recognizing qualitative criterion, it remains to meaningfully combine scores from such quantitative and qualitative criterion.

Indeed, premiere content providers (e.g. Disney.com) and premiere ad network operators (e.g. Yahoo!) are particularly conscientious about keeping the user experience at acceptable levels while optimizing the monetization aspects of internet advertising. This optimization becomes more complex when both content and an ad are delivered together, and still more complex when inline ads are provided by third parties who many not possess a high degree of technological sophistication as regards the inner workings of internet advertising. Techniques and systems are needed for ranking vendors by combining quantitative and qualitative characteristics of third-party advertising such that poorly-performing ads from third-party ad serving can be identified and then subjected to corrective action. One such technique as is disclosed herein includes methods and systems to instrument ads such that actual ad performance can be measured. Also disclosed herein are techniques to collect certain performance data in real time, techniques to collect certain qualitative data over a time period, and techniques for ranking vendors by combining quantitative and qualitative characteristics of third-party advertising to form a reputation score. Various embodiments aggregate and report reputation scores in a manner that supports administration of corrective actions.

FIG. 1 depicts an internet ad ecosystem 100 for serving content and inline advertisements including an ad network server, a content distribution server, and a third-party network of servers. As shown, the internet ad ecosystem includes a network 130 (e.g. the internet and any subnets comprising any part of the internet) and a client system 116.

In operation, the internet ad ecosystem 100 as shown coordinates activities of multiple participants for serving ads including content and inline ads and, more particularly, the internet ad ecosystem serves for measuring inline ad performance where servers within a third-party network 120 are employed.

In exemplary operation, an ad originator 101 (e.g. an advertiser, an agency, and ad vendor, and/or their servers) can place an ad within some publisher's content. For example, an ad originator can establish a contractual relationship with a publisher for placement of an internet ad. When the publisher's content is requested by a user, the publisher's content and the inline advertisement are composited for display on the user's display device (e.g. on client system 116). In some cases, the contractual arrangement may include an ad network operator (not shown). In such a case the publisher's content may be composited using a content distribution server 114 (and a content distribution server repository 115) in conjunction with an ad network server 112 (and an ad network server repository 113). An ad network server repository 113 can include a reputation data structure (further discussed below). Further, a reputation data structure can contain a data structure for mapping a third-party internet ad to the vendor (e.g. an originator, an advertiser, an ad agency, etc). Such a data structure can be embodied in many forms, one example of which is a two-column table holding a vendor name in a first column and an advertisement index (or advertisement ID) in a second column, where each row in the table represents a mapping between a vendor and an advertisement.

In a slightly more sophisticated example, an ad agency may operate on behalf of an advertiser, and might establish contractual relationships with a publisher, and/or an aggregator, and/or an ad vendor. In actual operation, an ad agency server 104 (using an agency server repository 105) may place an ad on behalf of an advertiser by embedding an ad or a portion of an ad, or embedding a link to an ad or a link to a portion of an ad, within some publisher's content (e.g. within content stored in a publisher server repository 107) accessible by a publisher server 106. Similarly, an ad agency server 104 (using an agency server repository 105) may place an ad on behalf of an aggregator by embedding an ad or a portion of an ad, or embedding a link to an ad or a link to a portion of an ad, within some aggregator's content (e.g. within content stored in an aggregator server repository 109) accessible by an aggregator server 108. In yet another example, an ad agency server 104 (using an agency server repository 105) may place an ad on behalf of an ad vendor by embedding an ad or a portion of an ad, or embedding a link to an ad or a link to a portion of an ad, within some ad vendor's content (e.g. within content stored in an ad vendor server repository 111) accessible by an ad vendor server 110.

It is possible that an advertiser (with or without an agency) participates in the internet ad ecosystem 100 by operating the advertiser's own servers (see advertiser server 102) and, possibly also using an advertiser server repository 103, may place an ad on the advertiser's own behalf by embedding an ad or portion of an ad, or embedding a link to an ad or a link to a portion of an ad, within some publisher's content (e.g. content stored in a publisher server repository 107, and/or in an aggregator server repository 109, and/or in an ad vendor server repository 111, and/or in a content distribution server repository 115).

Quantitative Measurement of a User Experience

Quantitative aspects of a user experience (e.g. user perception) might include technical variables. For example, a quantitative technical variable might include the loading time of a user's requested page. For example a user might navigate using a browser to http://disney.com and expect to see content related to Disney. In general a web page might be composited using several regions. For example, a web page might contain a plurality of components to be placed in corresponding regions on the page. In some cases, a front page of a destination site (e.g. Disney.com) can comprise a region for display of branding information (e.g. a component including the Disney logo), a region for a banner ad component, a region for a video display component, a region for a coupon (e.g. with clickable components), and any number of regions for user interaction (e.g. any number of components comprising links, buttons, screen devices, etc).

The loading time of a destination page includes the aggregate time (e.g. overall response latency) as incurred by all of the components that participate in delivery of the content and advertisements after adjusting for any time-wise parallel loading operations. It is possible that a destination page may contain multiple advertisements, each occupying a particular region or position on the page. Any ad or portion of an ad might be delivered from within an advertiser network, or an ad or a portion of an ad might involve a network call to a server within a third-party network in order to deliver the ad in its entirety.

Quantitative aspects of a user experience might also include non-technical variables. Some non-technical variables might include characteristics of a vendor's or advertiser's relationships within the ad serving ecosystem. For example, a quantitative, non-technical variable might derive from values based on the revenue the participant generates, the number of years the participant has been associated with the ecosystem, etc.

Qualitative Measurement of a User Experience

Qualitative variables can be included in measurements of a user experience. Qualitative variables can include purely qualitative measures (e.g. "thumbs-up", or "thumbs-down"). One or more qualitative variables can be converted to a number, and the number used in numeric scoring. Another example of qualitative measures is a "positive" qualitative feedback from a user feedback survey (or a "negative" qualitative feedback from a user feedback survey).

Combining Quantitative and Qualitative Characteristics of Third-Party Advertising The value of a quantitative variable can derive from a technical variable or a non-technical variable. Similarly, the value of a qualitative variable can derive from a technical variable or a non-technical variable. For example, a score can be described as a function of both technical and non-technical variables associated with the ad. In some cases a score can be cast as a reputation score, and a reputation score can be stored in a reputation dataset 142 as:

$$\text{Reputation\_Score} = f(\text{technical\_variables}, \text{nontechnical\_variables}) \quad \text{(Equation 1)}$$

Further examples of technical variables include ad latency, click-through rate (CTR), ad editorial assessment data, volume of "thumbs-up" ad user qualitative feedback responses, and other such measured input data.

For example, measured input data can be derived from a variety of sources, related quantities computed, and results presented in a variety of displays such as:
- Ad latency data can be obtained from an ad network server 112 (e.g. the time in milliseconds taken for an ad to load onto the user's display device).
- The average latency time of all displayed ads can be computed for a time period of interest.
- Click-through rate (CTR) data, possibly including the number of page views and number of clicks, can be computed.

Ad quality data obtained from a human "creative tester" could contain the results of different tests conducted on ads. As an example, results can be quantized using the measured fail ratios (e.g. number of fails/number of times tested). Fail ratios are further discussed in subsequent paragraphs.

Ad information data: Vendor-to-Ad mappings and Advertisers-to-Ad mappings are used for computing scores of vendors and advertisers based on the scores of their ads.

In some embodiments, the latency, CTR, and quality data can be cast into ratios (dimensionless values) that range from 0 to 1. In an exemplary embodiment, a score or a constituent of a score can range from 0 to 100. Constituents of a score can vary independently from other constituents, and combining constituents of a score might use a linear combination for calculating a reputation score. A reputation score can be a single value (a numeric value from 0 to 100), and such a score might be stored in a reputation dataset 142. Moreover, constituents of a score might be stored in a reputation dataset 142, possibly in a time series of measurements. An analysis (i.e. human analysis or computer-aided analysis) might consider the constituent scores individually in order to diagnose why a vendor or advertiser is performing in a certain way (e.g. why a vendor or advertiser has a low reputation score).

Instrumenting Third-Party Advertising

Using the techniques described herein, individual ads can be instrumented and the performance of individual ads can measured in real time; thus the network performance (e.g. latency) of an ad may be quantified. Network performance (e.g. latency) of a particular ad often refers to the end-to-end time measured from the start of the ad request (e.g. from an ad call) until the requested ad (including any components) is fully loaded and rendered by the browser onto the user's client system. Operations that incur measurable time include:

1. The time for any ad network server 112 calls to respond to an ad call (i.e. to fetch the ad to be placed);
2. The time for any calls made to a content distribution server 114 within a content distribution network (CDN) from the client system browser to fetch any components of the ad (e.g. any assets, screen devices, JavaScript code, flash libraries, etc);
3. The time for any calls made to any server or servers within a third-party network 120 in order to fetch any ads, including any redirects that may result in subsequent ad calls to further servers (possibly recursively); and
4. The time to render the ad onto the user's client system display.

Given these operations as incurred for rendering an ad, the ad performance is perceived by the user to be only as fast as the end-to-end performance. Thus, some of the techniques disclosed herein serve to monitor such operations in order that poorly performing ads may be identified such that corrective action may be taken.

In some cases the instrumentation and measurements taken as described in the previous paragraphs can be extended to cover any collection of ads, even ads within ads, or even screen devices within ads within ads, etc. Accordingly, tables and/or charts that capture the distribution of latencies can be constructed from the responses of the instrumentation and measurements taken.

Latency Scoring

For example, Table 1 shows the distribution of daily average latencies according to the instrumentation and measurements taken of all the ad IDs from April to June 2010.

TABLE 1

| Latency of Response (milliseconds) | Frequency (as a % of all measurements) |
|---|---|
| 400 | 5% |
| 500 | 10% |
| 600 | 5% |
| 850 | 23% |
| 900 | 25% |
| 950 | 22% |
| 1000 | 2% |
| 1300 | 5% |
| 1500 | 2% |
| 2000 | <1% |

As another example, Table 2 shows the cumulative distribution of daily average latencies according to the instrumentation and measurements taken from all of the ad IDs from April to June 2010.

TABLE 2

| Latency of Response (milliseconds) | Cumulative Frequency (as a % of all measurements) |
|---|---|
| 400 | 5% |
| 500 | 15% |
| 600 | 20% |
| 850 | 43% |
| 900 | 68% |
| 950 | 90% |
| 1000 | 92% |
| 1300 | 97% |
| 1500 | 99% |
| 2000 | ~100% |

As shown in Table 2, the distribution of all the ads measured substantially accumulates to nearly 100% for ads having a latency of 1500 milliseconds or less.

For the purpose of ranking vendors by combining quantitative and qualitative characteristics of third-party advertising, quantitative measurements (e.g. as shown and described in Tables 1 and Table 2) can be mapped against a scoring function.

Figure 2A:
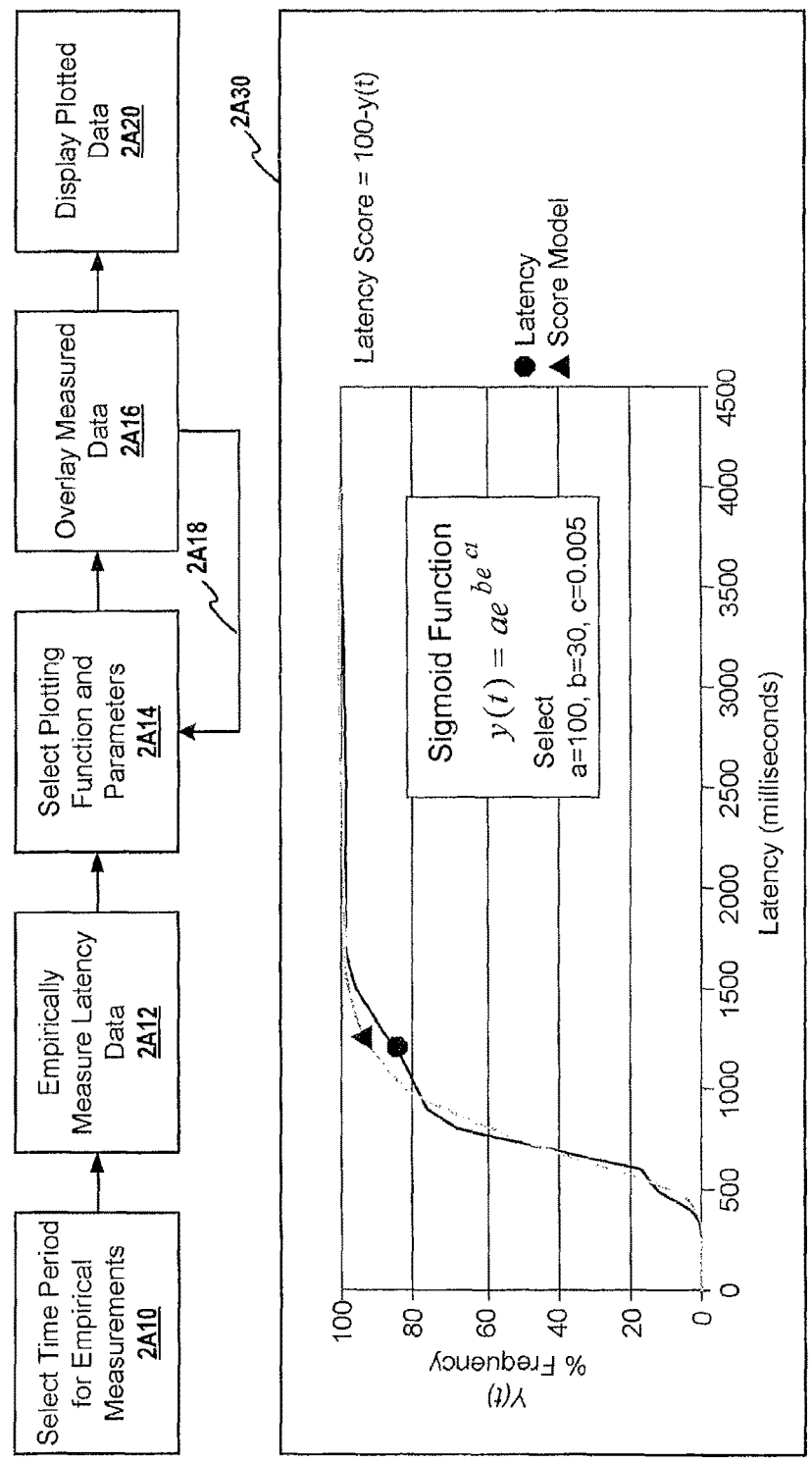
FIG. 2A empirically-measured latency data mapped against a sigmoid scoring function.

FIG. 2A depicts empirically-measured latency data mapped against a sigmoid scoring function. The empirically-measured latency data plot is merely an illustrative example and is not intended to be limiting. Using such a mapping (e.g. overlay) technique, that is, mapping empirically-measured latency data mapped against a sigmoid scoring function 2A30, the characteristics of the overlay characterizes how well a group of ads performed—as compared to the empirically-measured latency for all other plotted ads.

As shown, empirically-measured latency data from an ad (or group of ads) is plotted against a mathematical function having an 'S' shape. It is possible to plot empirically-measured latency data from all measured third-party ads (e.g. including all advertisers, all ad agencies, etc) against such a mathematical function, and then tune or curve-fit by selecting tuning or curve-fitting parameters. Then the empirically-measured latency data for a particular ad can be compared against all empirically-measured latency data from all measured third-party ads using a numeric score. For example, if a given ad has a latency score of say, 75 (out of 100), that latency score indicates that the given ad performed better than 75% of all of the ads that were served from all measured third-party participants on the ad network.

In keeping with the intuitive nature of such a score (i.e. a latency score of 75 out of 100 means that the given ad performed better than 75% of all of the ads), the scoring mathematical function has a similar shape to the cumulative distribution function depicted in Table 2. One such mathematical function that has the desired 'S' shape is a sigmoid function or variant.

One such sigmoid function variant is a Gompertz function. A Gompertz function is a type of mathematical function that can be used to characterize a series of points, where the values (and rate of change in successive values) is lowest at the start and end of the plotted series. In a plot of a Gompertz mathematical function, the right-side plots the asymptote of the function toward some maximum value. Using a Gompertz mathematical function, the right side horizontal asymptote is approached more gradually by the curve than is the left-side horizontal asymptote. A Gompertz curve can be implemented by a mathematical function having three parameters: a, b, and c:

$$y(t)=ae^{be^{ct}} \quad \text{Equation 2}$$

In the example of FIG. 2A, the first parameter a is the maximum amplitude. In the situation as described in this discussion of FIG. 2A, the desired maximum score is 100 (in a range of scores from 0 to 100) thus the value of a is set to 100. The other two parameters b and c are calculated by maximizing the fit between the measured latency data (specifically as plotted in a cumulative distribution such as Table 2) and the Gompertz curve. In doing so, and following the specific example as plotted in FIG. 2A, if a given ad has an average latency of 1000 milliseconds, it has performed worse than 80% of the total of the measured ads. Thus a latency score can be calculated directly from a mapping onto the Gompertz curve; for example, a latency score can be defined as:

$$\text{latency\_score}=100-y(t)=20 \quad \text{Equation 3}$$

where y(t) is a function of measured latency.

Now, a procedure for arriving at a plot such as is shown in FIG. 2A (see sigmoid scoring function 2A30) can be described as follows:

Select a time period for taking empirical measurements. For example, "for the months April to June 2010". See step 2A10.

Empirically measure latency data. For example, take latency data measurements for individual ads as may be instrumented for measuring real-time latency performance. See step 2A12.

Select a plotting function and set or calculate parameters. See step 2A14.

Overlay the data as measured in step 2A12. See step 2A16. In some cases the steps, including operations to set or calculate parameters (e.g. step 2A14), and the results of the overlay (see step 2A16) may be repeated in order to set or calculate parameters so as to define a mathematical function to more closely approximate the overlaid data. See path 2A18.

Display the plot. See step 2A20.

Figure 2B:
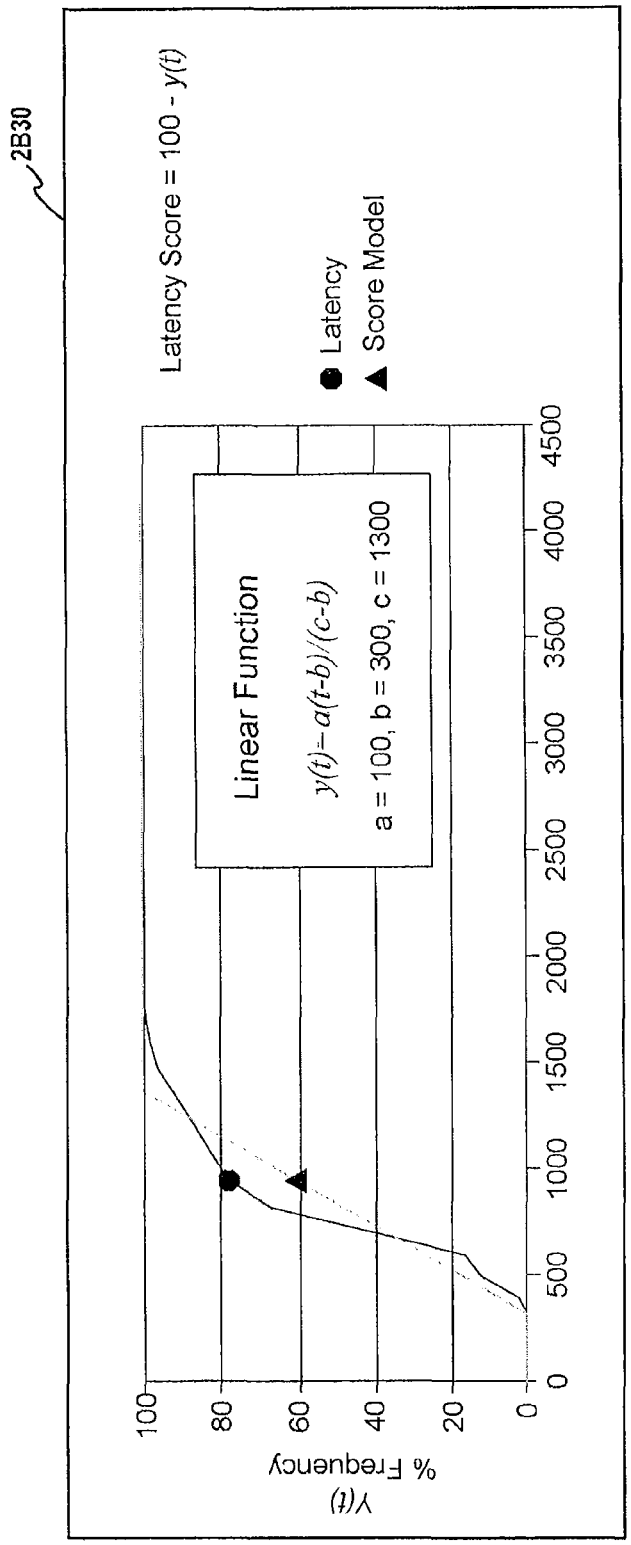
FIG. 2B depicts empirically-measured latency data mapped against a piece-wise linear approximation of a sigmoid scoring function.

FIG. 2B depicts empirically-measured latency data mapped against a piece-wise linear approximation of a sigmoid scoring function. The empirically-measured, linearized scoring function 2B30 is merely an illustrative example and is not intended to be limiting. Using such a mapping (e.g. overlay) technique, that is, mapping empirically-measured latency data mapped against a scoring function, the characteristics of the overlay characterizes how well an ad performed—as compared to the empirically-measured latency for all other ads. The aforementioned FIG. 2A depicts mapping empirically-measured latency data mapped against a sigmoid (or Gompertz) scoring function. Another mapping option is to approximate a sigmoid (or Gompertz) scoring function using a linearized scoring function 2B30 as shown in FIG. 2B. As shown, if an ad has an average latency of less than 300 milliseconds, it receives a score of 100; if it is greater than 1300 milliseconds, the score would be zero.

Thus, using a linearized function, a latency score can be calculated directly from a mapping onto the plot of y(t). Although the function for y(t) is different in the linearized scoring function 2B30 as compared to the sigmoid scoring function 2A30, nevertheless a latency score can be defined as:

$$\text{latency\_score}=100-y(t)=20 \quad \text{Equation 3}$$

where y(t) is a function of measured latency.

Again referring to FIG. 2A, one step earlier discussed is to overlay the data as measured in step 2A12. In some cases, the steps including operations to set or calculate parameters (e.g. step 2A14) and the results of the overlay (see step 2A16) may be repeated in order to set or calculate parameters so as to define a mathematical function to more closely approximate the overlaid data. See path 2A18. For using a score model based on a linearized function, the parameters a, b and c are set, selected, or calculated to maximize the fit between the model and the overlaid data.

Figure 2C:
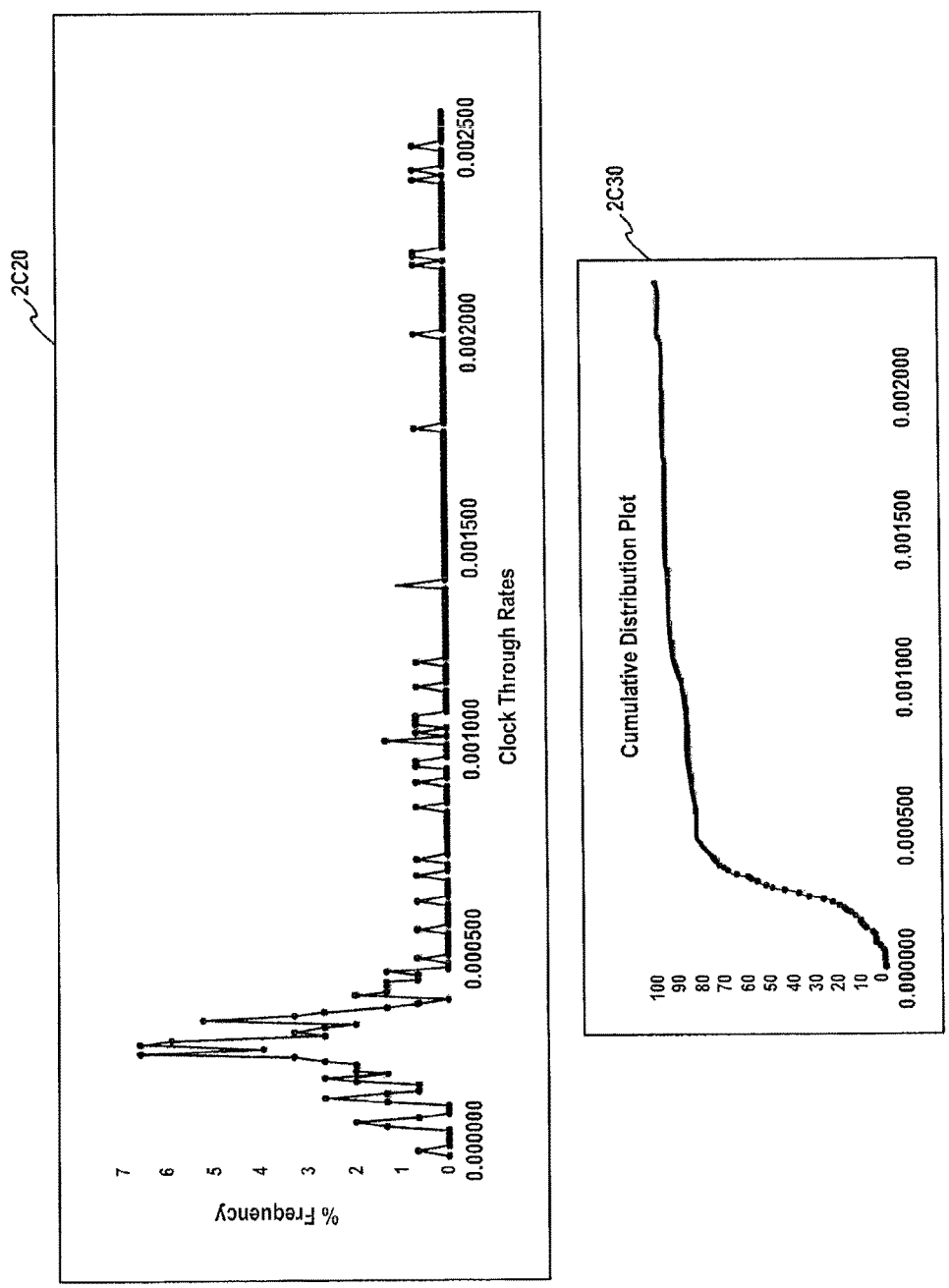
FIG. 2C depicts empirically-measured average click-through rates (CTRs) formatted as a histogram-like plot and a cumulative distribution plot.

FIG. 2C depicts empirically-measured average click-through rates (CTRs) formatted as a histogram-like plot and a cumulative distribution plot. The click-through rates shown in the histogram plot 2C20 and the click-through rates shown in the cumulative distribution plot 2C30 are merely illustrative examples and are not intended to be limiting.

As shown, the click-through rates of the histogram plot 2C20 plots click-through rates for all the ads measured over a time period (e.g. from April to June, 2010). Also, as shown, the click-through rates of the cumulative distribution plot 2C30 plots cumulative click-through rates for all the ads measured over a time period (e.g. from April to June, 2010). As can be seen from the click-through rates of cumulative distribution plot 2C30, around 80% of the ads have click-through rates of less than 0.001:

$$\text{CTR\_score}=100-y(t)=20 \quad \text{Equation 4}$$

where y(t) is a function for measured click-through-rates.

Figure 2D:
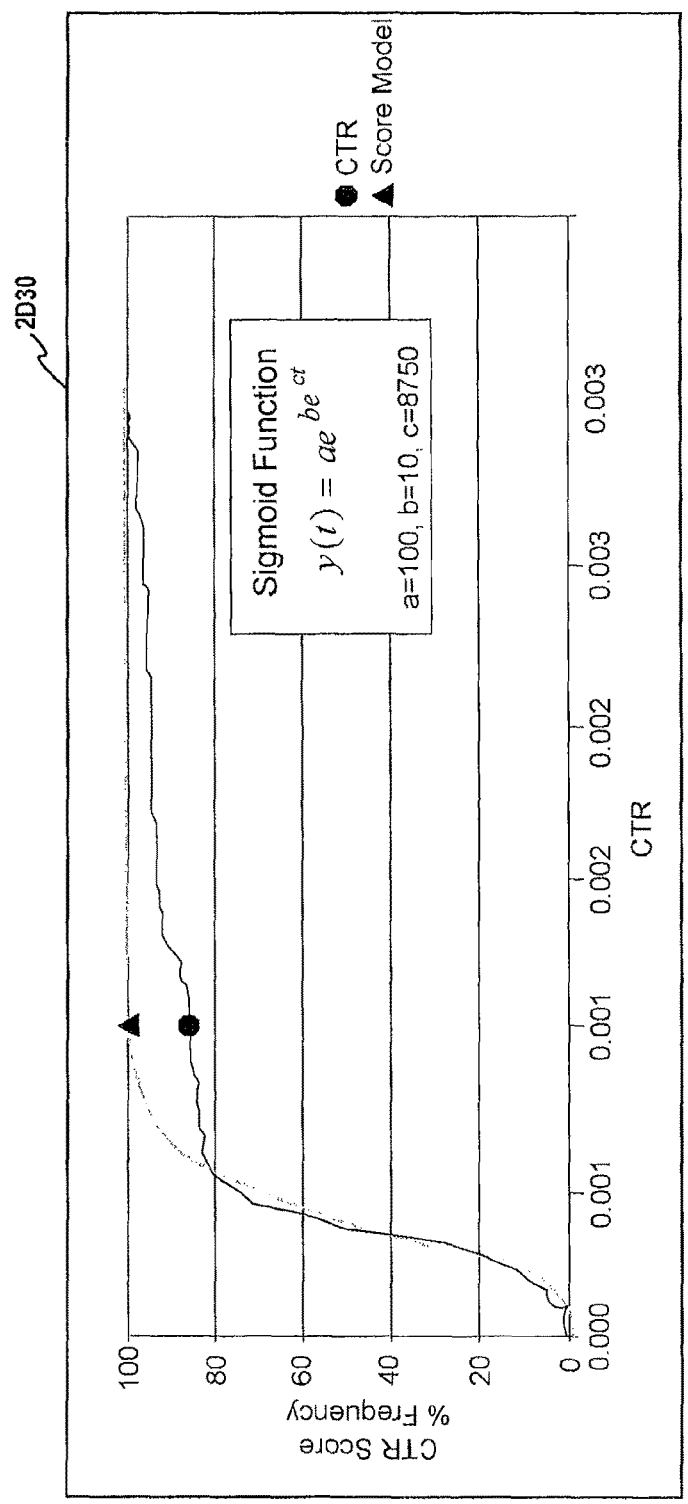
FIG. 2D depicts empirically-measured click-through rate data mapped against a sigmoid scoring function.

FIG. 2D depicts empirically-measured click-through rate data mapped against a sigmoid scoring function. The empirically-measured click-through rate data plot 2D30 is merely an illustrative example and is not intended to be limiting. Using such a mapping (i.e. overlay) technique, that is, mapping empirically-measured click-through rate data against a scoring function, the characteristics of the overlay characterizes how well a group of ads performed—as compared to the empirically-measured click-through rate for all other ads.

Click-Through Rate Scoring

Figure 2E:
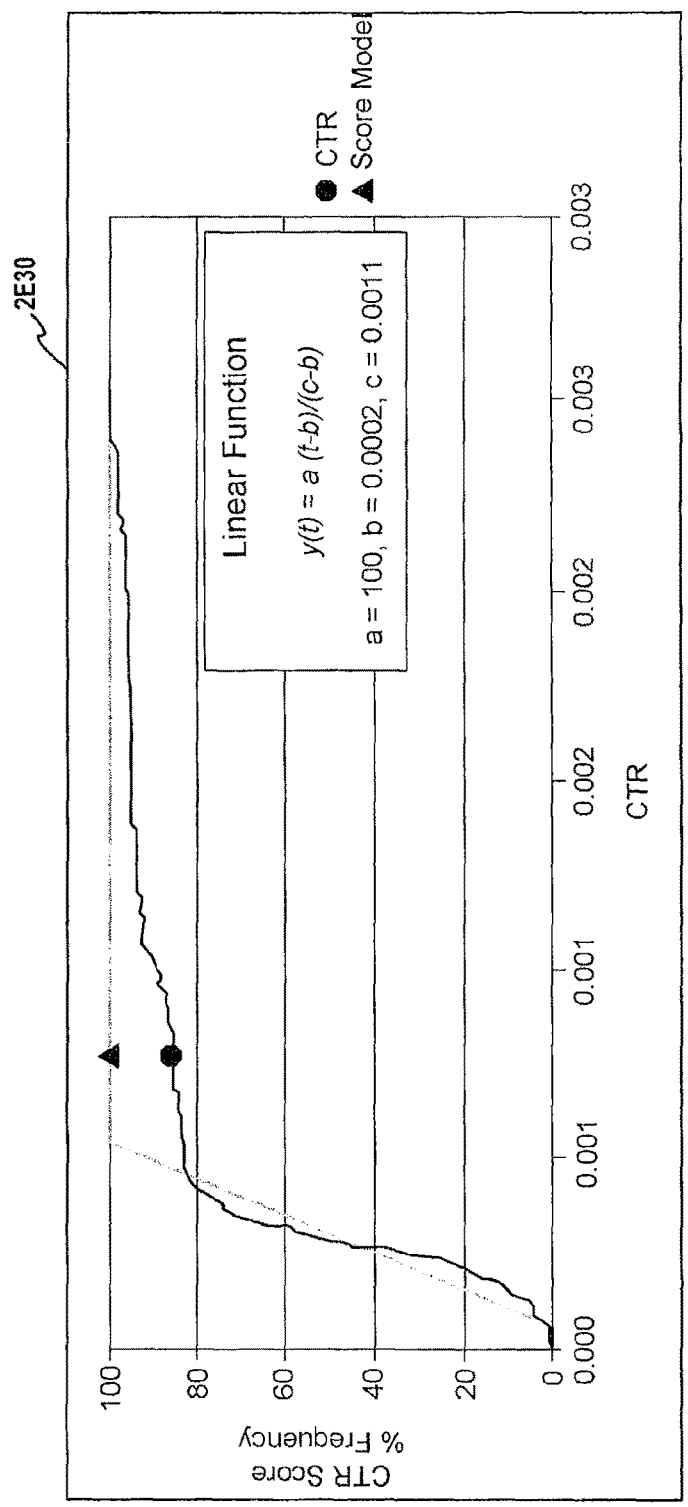
FIG. 2E depicts empirically-measured click-through rate data mapped against a piece-wise linear approximation of a sigmoid scoring function.

A similar rationale was used for click-through rate (CTR) scoring as well. The sigmoid and linear models are shown in FIG. 2D and FIG. 2E with the exemplary parameters. When the CTR data has similar distribution compared to a calibration set, the scores will closely indicate the relative performance. When there are significant changes in the distribution (e.g. due to some future events or future capabilities), it is reasonable to carry out the calibration again and use new parameters.

FIG. 2E depicts empirically-measured click-through rate data mapped against a piece-wise linear approximation of a sigmoid scoring function. The empirically-measured click-through rate data plot 2E30 is merely an illustrative example and is not intended to be limiting. Using such a mapping (e.g. overlay) technique, that is, mapping empirically-measured click-through rate data against a scoring function, the characteristics of the overlay characterizes how well an ad performed—as compared to the empirically-measured click-through rate for all other ads.

The score model as shown uses a piecewise linear function. The parameters a, b and c are set, selected or calculated to maximize the fit between the piecewise linear function and a cumulative distribution plot.

Figure 3:
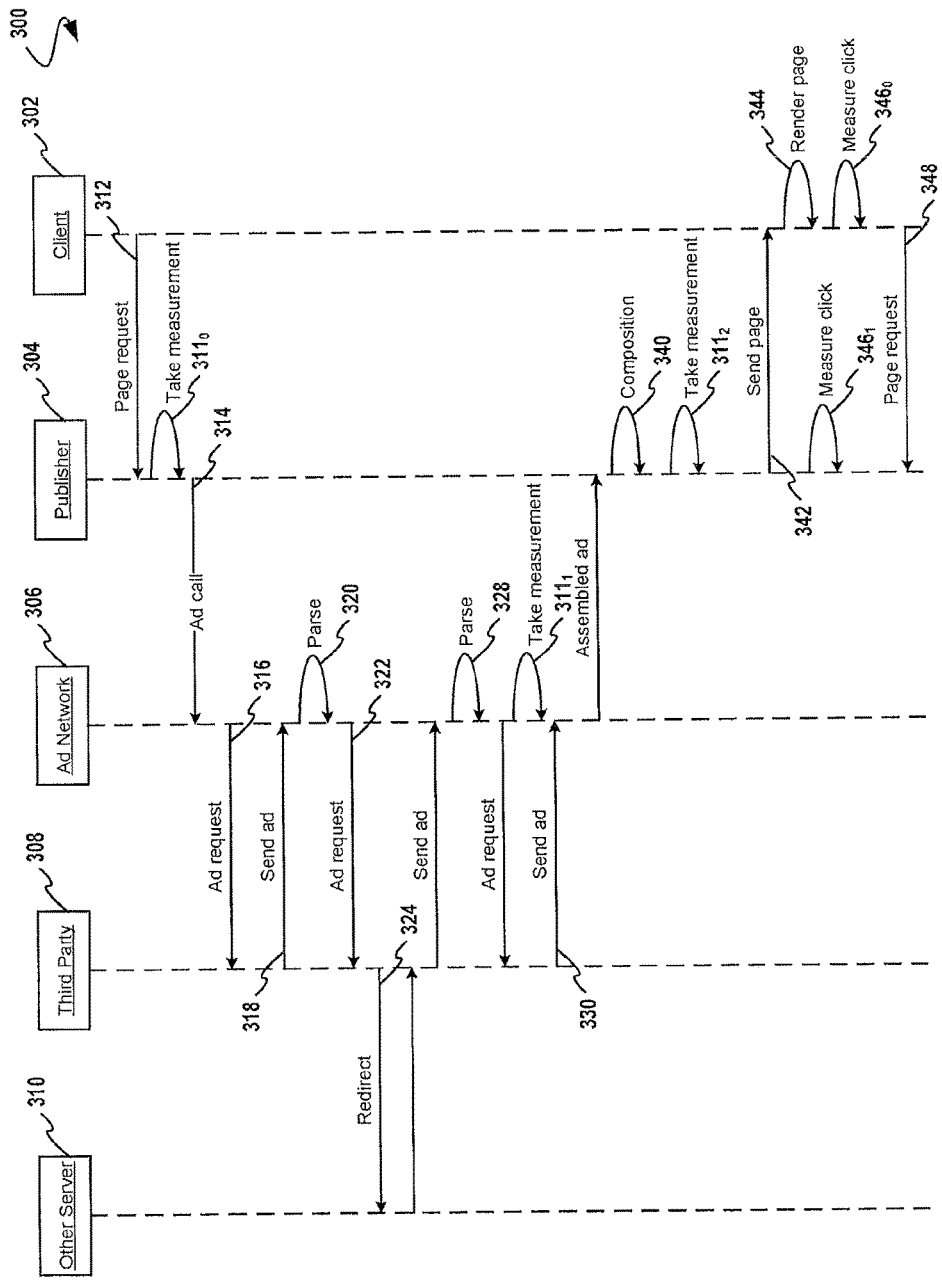
FIG. 3 depicts a communication protocol for rendering an ad, including measuring aspects of retrieval of components from a third-party network, according to an exemplary embodiment.

FIG. 3 depicts a communication protocol for rendering an ad, including measuring aspects of retrieval of components from a third-party network, according to an exemplary embodiment.

As shown, a client 302 (e.g. client system 116) sends a page request, e.g. clicks on a link to a destination page, (see message 312) to a publisher 304 (e.g. to a publisher server 106). The event of sending a page request (see message 312) to a publisher 304 can be measured (see operation 311.sub.0), possibly using embedded instrumentation code. As the publisher 304 begins to compose the requested page, the compositing operation (not shown) may encounter an advertisement, which in turn results in an ad call (see message 314) sent to an ad network 306. In exemplary embodiments, the ad network 306 may include an ad network server 112, upon which ad network server 112 the ad call is resolved to an ad request (see message 316). The ad request may involve a further network request to a third party 308, or more specifically the ad request may involve a further network request to a server within a third-party network 120, and such a server (e.g. advertiser server 102, ad agency server 104, publisher server 106, aggregator server 108, or ad vendor server 110) can respond by sending the ad to the requestor (see message 318). The requestor, in this exemplary case, the ad network 306, can parse the code comprising the ad (see operation 320) which may then cause the ad network 306 to send a further ad request (see message 322), which in turn might be redirected (see message 324) to still another other server 310—and possibly recursively where the operation to parse the code comprising the ad makes a call to another server that in turn performs an operation to parse the code comprising the ad. Upon receipt of the requested ad (i.e. after the aforementioned redirection), the ad network 306 continues to parse, in this case parsing (see operation 328) the material just returned from the other server (see message 330). At some point the components of the ad that became the subject of the ad call (see message 314) are all available, and thus the assembled ad can be sent to the publisher for composition (see operation 340), and possibly a measurement can be taken for subsequent determination of latency (see operation 311.sub.1). Once composited, the web page requested by the client 302 is sent to the client (see message 342) for rendering (see operation 344) on a client system display. Also, at that approximate moment in time, a measurement can be taken for subsequent determination of latency (see operation 311.sub.2). Using any of the interactive screen devices returned in the displayed web page, the user's click may be measured (see operation 346.sub.0) and a page request (see message 348) may begin a new sequence. Alternatively, the user's click may be measured (see operation 346.sub.1) from a server (e.g. a server of publisher 304).

Any one or more of the aforementioned messages and/or operations may contribute to the response latency and thus to the performance of the page rendering, which may result in a user perception of subjectively unacceptable ad performance. Accordingly, the techniques herein can be applied to any one or more of the aforementioned messages and/or operations that contribute to measurable ad performance. A wide range of messages and operations may be involved in measuring inline ad performance, especially for ad serving involving third-party networks.

It should be emphasized that the specific computers (e.g. 302, 304, 306, 308, and/or 310) may serve to perform at least some portion of the described messaging and operations. In particular, any portion of receiving a third-party internet ad, and/or recoding the third-party internet ad, and/or measuring inline ad performance, may be performed (in whole or in part) by any one or more computers.

Characteristics Influencing Instrumentation and Measurement

To enable reliable and user-acceptable performance of an ad network supporting third-party ads, there is a need for techniques and systems for instrumenting ads, for collecting performance metrics, and for determining corrective action to take for low-performing third-party ads. Exemplary systems include one or more of the following characteristics where:

- Total third-party network time (e.g. ad server time, third-party ad selection/redirect time, etc) should meet a defined service level. Such a level could be defined in a service level agreement (SLA) for ad delivery. An SLA can be defined, for example, using a latency score (see Equation 3).
- Total third-party network time may include content distribution time when a third-party network requests such content. For example, see path 140 of FIG. 1.
- Instrumentation collects a measurement of various ad latencies (e.g. granularity of hops, latency per hop, etc). For example, see any instances of the operation 311 of FIG. 3.
- Post-processing serves to catch offenders (i.e. third parties operating on poorly-performing networks or serving poorly-performing ads).
- Offenders are identified in near-real-time, and alerts can be issued based on a latency score, or based on a frequency threshold.
- Turnaround time for an ad to be flagged for corrective action can be set based on a latency score.
- Exemplary systems support use of a reputation dataset 142 in the case of a long latency or otherwise missed SLA (e.g. from a third-party network call time out).
- Exemplary systems support use of a reputation dataset 142 in the case of a long latency or otherwise missed SLA (e.g. from a content distribution network call time out).

Specific Metrics

The systems as herein described serve to collect both quantitative and qualitative data related to the ad and real-time actual performance. For example:

1. Quantitative Metrics—a collection of quantitative data regarding each third-party ad call (i.e. hop) and hop latencies.
2. Qualitative Metrics—a collection of qualitative data from users (e.g. user qualitative feedback as to page loading, page rendering, offensive content, etc).
3. Final Scoring—a collection of both quantitative and qualitative data metrics.

Networked Systems for Online Advertising

Figure 4:
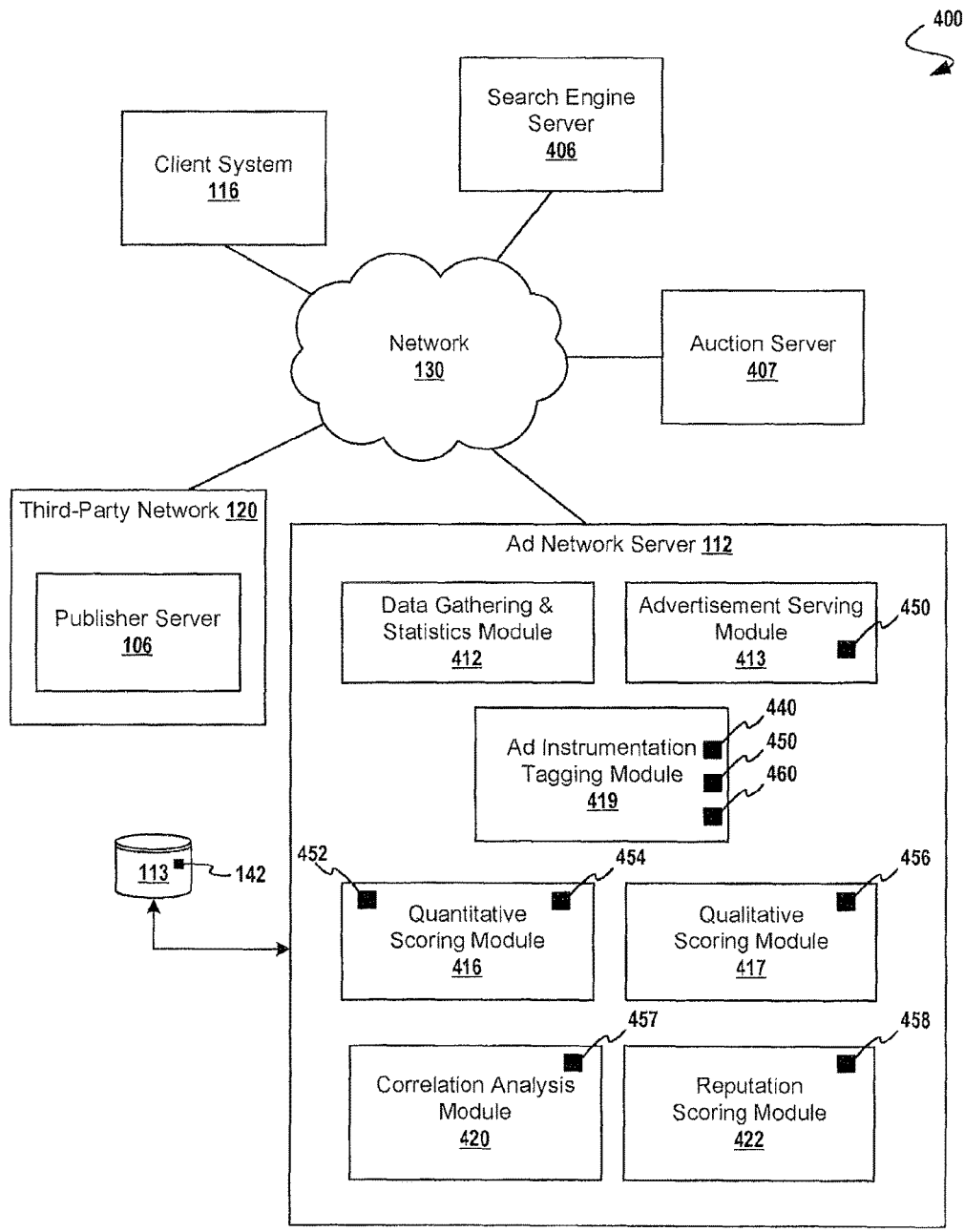
FIG. 4 depicts an advertising server network including modules for ranking vendors by combining quantitative and qualitative characteristics of third-party advertising, in which some embodiments operate.

FIG. 4 depicts an advertising server network including modules for ranking vendors by combining quantitative and qualitative characteristics of third-party advertising.

In the context of internet advertising, placement of advertisements within an internet environment (e.g. online advertising system 400 of FIG. 4) has become common. As shown, network nodes are organized into a network such than an internet advertiser or agent may select a particular property (e.g. Yahoo.com), and may create an advertisement such that whenever any internet user, via a client system 116, renders the web page from the selected property, possibly using a search engine server 406, the advertisement is composited on the web page by one or more servers (e.g. a server within a third-party network 120 and/or an ad network server 112) for delivery to a client system 116 over a network 130. Given this generalized delivery model, and using techniques disclosed herein, sophisticated online advertising might be practiced. Moreover the online advertising system 400 may serve various needs of third-party participants in the internet ad ecosystem 100, including booking of contracts for internet advertising campaigns, and for management of a wide range of aspects of prosecuting such an internet advertising campaign.

Again referring to FIG. 4, an internet property (e.g. embodied in a publisher server 106) might be able to attract internet visitors, which visitors may have any arbitrary interest, demographic, target predicates, or other attributes. In fact, a publisher server 106, possibly in conjunction with a data gathering and statistics module 412, can capture details as pertains to user behavior. Thus, an internet user's behaviors, demographics and interests might be 'known' in quite some detail as pertains to a wide range of user queries, interest categories, or other demographics or attributes. Also, behaviors (e.g. the likelihood of a click or other measurable event) might be known in quite some detail, not only for a particular user, but also for a group of users corresponding to a particular slice of the available data. Such characteristics (i.e. one or more characteristics) and/or features can be used in the statistical modeling of users, even to the extent that a data gathering and statistics module 412 can forecast future supply accurately—or at least to a statistically known degree of accuracy. Thus, for a particular user, ads corresponding to the demographics of the particular user may be served as advertisements retrieved from an ad network server 112. In some situations, reaching a particular demographic is commercially competitive, so advertisements retrieved from an ad network server 112, possibly in conjunction with an auction server 407, may be used to resolve such a competition.

In some embodiments, the online advertising system 400 might host a variety of modules to serve management and control operations (e.g. a data gathering and statistics module 412, an advertisement serving module 413, etc) pertinent to managing contracts and for serving advertisements to users. In particular, the modules, network links, algorithms, assignment techniques, serving policies, and data structures embodied within the online advertising system 400 might be specialized so as to perform a particular function or group of functions reliably while observing capacity and performance requirements. For example, an advertisement serving module 413 might serve for storing an original third-party internet ad 450 in readiness for processing before the start of a corresponding campaign. As a further example, an ad instrumentation tagging module 419, a quantitative scoring module 416, a qualitative scoring module 417, a correlation analysis module 420 and/or a reputation scoring module 422 can operate partly in an offline (or batch) mode, and partly in a real-time (or interactive) online mode. As shown, and without regard to allocation of any particular operation to any particular mode, an ad instrumentation tagging module 419, can accept an original third-party internet ad 450 and recode it into one or more forms for producing a recoded third-party internet ad 460 using ad instrumentation code 440. Any one or more modules within an online advertising system 400 can operate cooperatively to implement a system for ranking vendors by combining quantitative and qualitative characteristics of third-party advertising.

Ad Instrumentation Tagging Module

In exemplary embodiments the following considerations are used to balance trade-offs when implementing systems for ranking vendors by combining quantitative and qualitative characteristics of third-party advertising:

1. Real Users in Real Time—Embodiments instrument ads for measurements taken in real-time as the users view ads embedded in publisher pages. In some cases, measurements are taken in real-time for each and every user that views the instrumented ads.

2. Near Real-Time Notification—Embodiments can instrument ads for real-time measurements, and can forward measurements to a server for enforcement.

3. Embodiments can capture certain HTTP round-trip latencies for any (or all) possible requests and hops that happen during the rendering of the ads (see ad request message 316, message 322, etc).

4. Embodiments support use of various adtags (e.g. iframe or JavaScript tags).

5. Embodiments support measurements in a wide range of environments (e.g. AJAX environments, etc).

6. Embodiments support measurements for various adtypes (e.g. text-only ads, simple graphic ads, rich media ads, etc).

7. Exemplary embodiments do not alter selection and/or rendering of ads, and do not adversely impact user experience.

8. Exemplary embodiments support a wide range of browsers, and the techniques can be used for any arbitrary content distribution network; and further, exemplary embodiments may be used in conjunction with any arbitrary third-party within a third-party network.

A module such as an ad instrumentation tagging module 419 can be employed to implement aspects of instrumentation tagging that implement solutions corresponding to some mixture of the above considerations.

Data Collection Aggregation and Scoring

Instrumented ads emit measurements regarding display of ads from third-party networks—namely, latency measurements and timeout occurrences and/or measurements. As earlier discussed, higher measurements tend to have a negative impact on user experience. Also, an increase in the number of occurrences of timeouts for a given ad can potentially point to an underperforming third-party network infrastructure for ads. Aggregation of these data points in near real-time can be used as an aid for immediately identifying corrective actions for such ads or for identifying corrective actions pertaining to underperforming third-party network infrastructure for ads.

Quantitative Data Collection

For purposes of this description, the discussion just below omits discussion regarding offline operations (e.g. operations pertaining to how an ad is booked and trafficked for serving). A simplified scenario is as follows:

1. A user visits a destination page for some internet property (e.g. mail.yahoo.com).
2. A latency measurement is taken.
3. The property server (e.g. the mail.yahoo.com mail server) issues a server side call to an ad server (e.g. a guaranteed delivery server) to fetch ads for the page.

Note that there could be multiple fetches for multiple ads corresponding to several different positions on a single page.
4. The user's browser parses the page and fetches page assets. More specifically, the browser receives the page with one or more ad sections (each such ad section possibly including references to assets such as images, video, flash etc). Where an ad section begins, 'Ad Instrumentation' might start. The browser continues to queue and fetch all the referenced assets. Retrieval of assets could precipitate server calls to third-party vendors such as DoubleClick, Atlas, PointRoll, Tumri, Teracent etc. The third-party calls may be chained and could further refer to additional assets via URLs referencing still further assets, possibly via third-party vendors or other servers.
5. The ad instrumentation execution concludes at the end of the ad instrumentation code 440.
6. A latency measurement is taken.
7. The page is displayed at the user's terminal.
8. User response is measured, possibly resulting in a click-through on the ad or other measurable user behavior. Various additional embodiments of a system for ranking vendors by combining quantitative and qualitative characteristics of third-party advertising are discussed below.

Qualitative Data Collection

The instrumentation technique discussed above is also integrated with the capability to collect qualitative feedback from a user or from an editorial process, and produce a quality score, possibly using a qualitative scoring module 417. The instrumentation code (or other technique) serves to collect and aggregate user qualitative feedback as pertains to the perceived ad characteristics, and/or as pertains to the editorial quality of the displayed ad, and/or as pertains to any issues around rendering of an ad in various browsers or on various platforms or devices. The qualitative feedback experience can be presented inline within the ad or near the ad (e.g. using an interactive screen device) such that it is easy for users to report a possible issue without having to leave the page being viewed.

A screen device for inline user qualitative feedback may be implemented using css/JavaScript (or other software) to dynamically render the qualitative feedback screen device, which, when activated, opens an inline overlay layer on top of the ad, thus presenting a screen device for soliciting inline user qualitative feedback. As the user interacts with the screen device, the user's inline qualitative feedback are aggregated and submitted to the qualitative scoring module 417. In some cases a qualitative scoring module 417 implements a qualitative feedback aggregation plug-in, which plug-in may be updated dynamically at any point in time.

Quality Scoring

A quality score can be calculated based on a plurality of variables. For example, Table 3 classifies and lists some of the possible tests to be applied to ads. As shown in Table 3, the qualitative tests can be classified into several types.

TABLE 3

| Security Alerts | Context Alerts | Technical Alerts |
| --- | --- | --- |
| Banned Advertiser | Adult | Creative is Blank |
| Contains ActiveX | Gambling | Causes JavaScript |
| Contains Virus | | Loads Non-Standard File Type |

TABLE 3-continued

| Security Alerts | Context Alerts | Technical Alerts |
| --- | --- | --- |
| High Risk Creative | | Loading or Serving Error/Timeout |
| Initiates Program | | Multiple Pops |
| Install | | Non-Approved Content |
| | | Triggers Invalid Click |
| | | Web Page Pop |

To take into account the different levels of severity associated with each of these test types, the test results for these test types are weighed using importance factors, F1, F2, F3, etc.

$$\text{quality}_{score} = 100 - ((F1 * M_{Security}) + (F2 * M_{Technical}) + (F3 * M_{Content}))$$ (Equation 5)

where the security measure ($M_{Security}$), the technical measure (MTechnical), and the content measure (M.sub.Content) quantities in Equation 5 are obtained from the fail ratios of each test type.

Depending on the distribution of fail ratios, the M-values ($M_{Security}$, $M_{Technical}$, and $M_{content}$) could be set equal to the corresponding fail ratio or could be set equal to the value of a function (e.g. a non-linear function or a linear function) of fail ratios. As discussed above, a quality score can be determined using Equation 5, however, there are some situations described as follows where a quality score is determined using additional criteria. For example, the following criterion can be used:

If an ad fails in at least one of the Security Alert type tests, then the quality score is set to 0.
If an ad fails in any aspect of the Content Alert type tests, then the quality score is 100−F2.
If an ad fails in any aspect of the Technical Alert type tests, then the quality score is 100−F3.
If an ad fails in both Content Alert type tests and in Technical Alert type tests, the quality score is 100−(F2+F3).

Final Scores

Both sigmoid and linear models for the mathematical function y(t) are disclosed above. The selection of a sigmoid or linear model (or any other curve-fitting function for that matter) can be implemented in software running on a processor. Regardless of the selected curve-fitting function for y(t), a final score can be calculated as a weighted linear combination of constituent scores, for example, a latency score (see latency score of Equation 3), a CTR score (see CTR score of Equation 4), and a quality score (see quality score of Equation 5). Formally:

$$\text{Reputation}_{Score} = w1 * \text{latency}_{score} + w2 * \text{CTR\_score} + w3 * \text{quality\_score}$$ (Equation 6)

where w1+w2+w3=1.

It should be noted that in many embodiments, including the embodiments described herein, the reputation score of Equation 1 can be the same as the reputation score of Equation 6; merely the representation differs.

In various embodiments, the weights (w1+w2+w3) for the linear combination depend on the particular use case. An exemplary technique described herein is to assign the highest possible weight to a quality score while retaining sensitivity of the reputation score to changes in latency and while retaining sensitivity of the reputation score to changes in CTR scores.

As regarding combining the aforementioned latency score, the aforementioned CTR score, and the aforementioned quality score (e.g. to form the aforementioned reputation score), the three combined scores need to be mathematically manipulated such that the score contribution from one score constituent does not unfairly eclipse the score contribution from a different score constituent. In many cases an arbitrary selection of W1, W2, and W3 (even where W1+W2+W3=1) does not necessarily result in a fair and balanced reputation score. One technique resulting in a fair and balanced reputation score is to assign the highest possible weight to a quality score while retaining sensitivity of the reputation score to changes in latency and/or CTR scores. Moreover, since the notion of a reputation carries a suggestion of changes in a reputation relative to others, the selection of weights W1, W2, and W3 should be allowed to vary over time, at least to the extent that the statistical measures pertaining to a dataset of measurements vary over time.

More formally, statistical correlation refers to any of a broad class of statistical relationships between two or more random variables or observed data values. With respect to the examples herein, statistical correlation refers to any of a broad class of statistical relationships between two or more series of observed data values (e.g. latency, CTR, quality).

Formally, dependence refers to any situation in which random variables do not satisfy a mathematical condition of probabilistic independence. In general, correlation can refer to any departure of two or more random variables from independence.

Those skilled in the art will recognize the notion of correlation coefficients, (often denoted r, or R) for measuring the degree of correlation. Some embodiments described herein employ the Pearson correlation coefficient, which is sensitive to a linear relationship between two variables (which linear relationship may exist even if one function is a nonlinear function of the other). Other types of correlation coefficients or other methods to calculate correlation coefficients may be more (or less) sensitive to nonlinear relationships.

A positive correlation between a component score and a reputation score is considered to be a measure of the sensitivity. So, the weights for the linear combination are adjusted such that an R or r value is positive and an $R^2$ (or $r^2$) value is greater than 0.5 for latency and CTR scores with the reputation score. R or r can be calculated by the following equation:

$$r = \frac{n\Sigma xy - (\Sigma x)(\Sigma y)}{\sqrt{n\Sigma x^2 - (\Sigma x)^2}\sqrt{n\Sigma y^2 - (\Sigma y)^2}}$$

where n is the number of the pairs in data. If R (or r)=+1, that means a perfect positive fit.

Now, returning to the discussion of FIG. 4, an ad network server might include a quantitative scoring module 416, a qualitative scoring module 417, a correlation analysis module 420, and a reputation scoring module 422. These four modules can work in conjunction to perform operations, calculations to perform the aforementioned steps, and/or algorithms for ranking vendors by combining quantitative and qualitative characteristics of third-party advertising. More particularly, quantitative scoring module 416 might implement Equation 3 (resulting in storing a latency score 452) and quantitative scoring module 416 might implement Equation 4 (resulting in storing a CTR score 454), a qualitative scoring module 417 might implement Equation 5 (and store a quality score 456), a correlation analysis module 420 might implement correlation algorithms (and store one or more instances of a correlation value 457), and a reputation scoring module 422 might implement Equation 6 (and store a reputation score 458).

Figure 5:
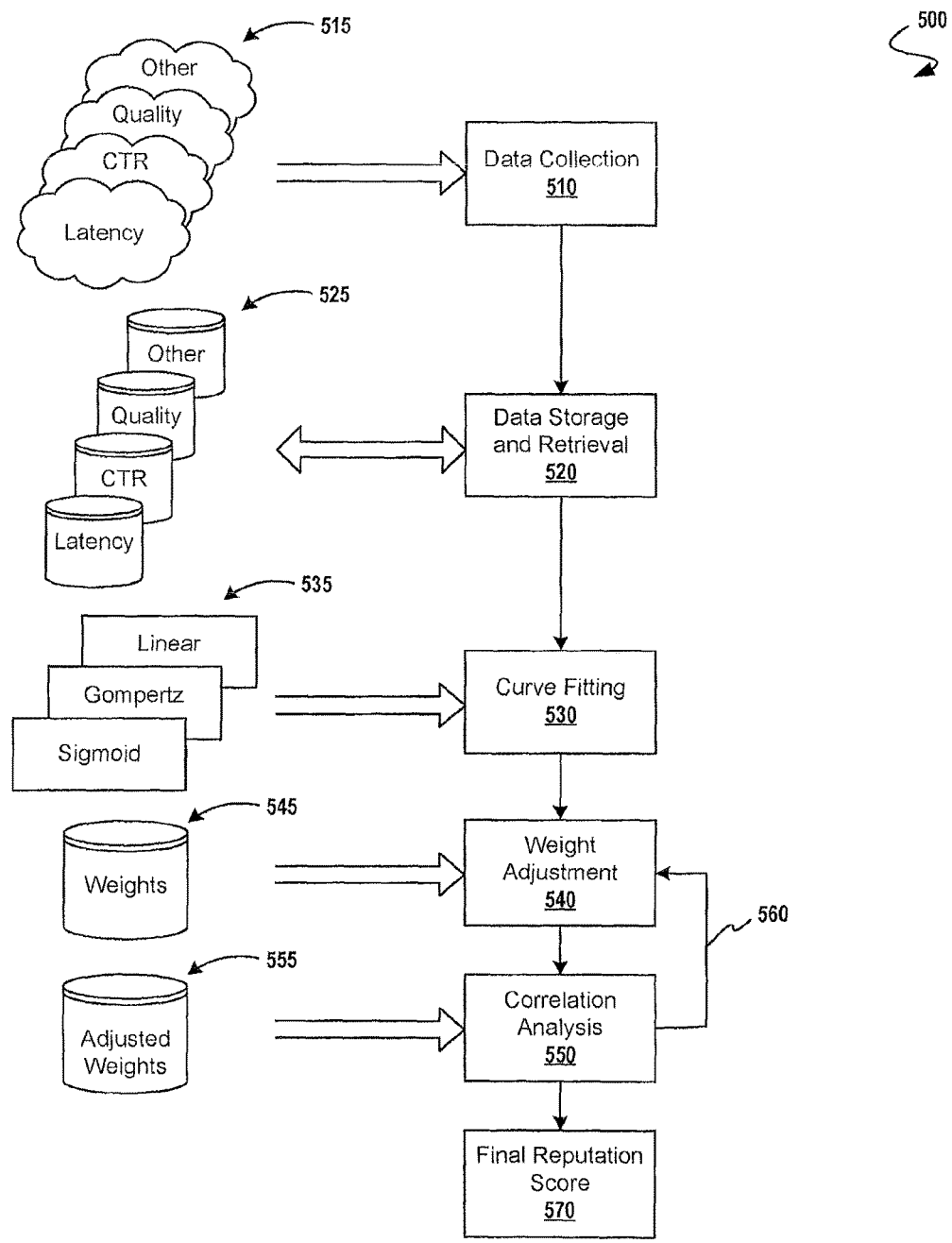
FIG. 5 depicts a data flowchart for ranking vendors by combining quantitative and qualitative characteristics of third-party advertising.

FIG. 5 depicts a data flowchart 500 for ranking vendors by combining quantitative and qualitative characteristics of third-party advertising. As shown, the data flow commences with data collection (see module 510), which operations therein serve for measuring characteristics (e.g. performance characteristics, quality characteristics) pertaining to a third-party internet ad. The data collection operations can receive data, or can measure data (or both), as pertains to characteristics of latency, click-through rate, quality, as well as other characteristics. The data flow continues with various data storage and retrieval (see module 520), which data storage may be facilitated by any techniques for non-volatile or volatile storage (see data storage 525). Such data collection and data storage may continue over a time period such that a time series of data is collected and stored for later retrieval. Given a retrieved time series of data (e.g. latency data collected over a time period), the series of data can be fit to a curve (see module 530). For example, a curve can be the curve of a mathematical function such as a sigmoid function. The curve, or more precisely a mathematical function 535 for describing a curve, can be stored and input to curve fitting operations.

In exemplary embodiments, the aforementioned operations of module 510 and module 520 are performed using any/all of latency data, CTR data, and quality data. When sufficient data has been collected, retrieved, and fit to a selected curve, weights 545 can be applied in a weight adjustment operation 540 to produce a weighted reputation score, as shown in Equation 6. However, weights initially selected from the selected curve weights 545 may not weight the constituent terms of the reputation score such that a fair and balanced reputation score is calculated based on assigning the highest possible weight to a quality score while retaining sensitivity of the reputation score to changes in latency and/or CTR scores. Accordingly, correlation analysis (see module 550) can be employed to perform correlation analysis, and adjust weights to produce the adjusted weights 555, possibly providing feedback and or iterations to or through another pass of correlation analysis (see the path 560).

Once sufficient correlation analysis and/or adjustment of weights has been performed such that a reputation score can be calculated based on assigning the highest possible weight to a quality score while retaining sensitivity of the reputation score to changes in latency and/or CTR scores, a final reputation score calculation can be performed (see module 570). For example, a module 570 can server for combining the latency score, the CTR score, and the quality score to form and report a reputation score.

Figure 6A:
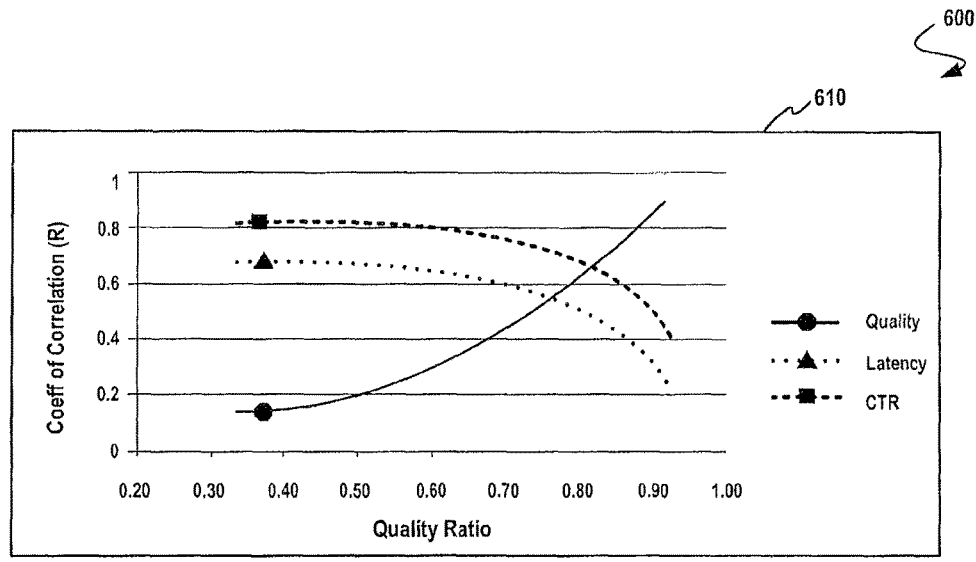
FIG. 6A depicts a plot of the coefficient of a correlation as a function of a quality ratio.

FIG. 6A depicts a plot of the coefficient of correlation as a function of a quality ratio. As shown, the curve of R (coefficient of correlation) for latency, for CTR, and for quality are plotted as the independent variable (i.e. quality ratio) is increased. The unadjusted weight ratio correlation plot 600 shown in FIG. 6A is based on arbitrarily-selected weights. However, the weights should be adjusted so that the correlation of latency and CTR scores with respect to the reputation score do not drop significantly. In this example, the weights have the following ratios:

$W_{Quality}:W_{Latency}:W_{CTR}$ is as $W_{Quality}:1:1$ and

Quality Ratio (the independent variable) $== \frac{W_{Quality}}{W_{Quality} + 1 + 1}$ A correlation algorithm can adjust the weights in order to assign the highest possible weight to the quality score while retaining sensitivity of the reputation score to changes in latency and/or CTR scores. As can be seen from the plot of FIG. 6A, latency correlation is lower than that of CTR. The weights affecting the reputation score for either latency or CTR (or both) can be adjusted relative to the to the quality score (i.e. to assign the highest possible weight to the quality score while retaining sensitivity of the reputation score to changes in latency and/or CTR scores).

Figure 6B:
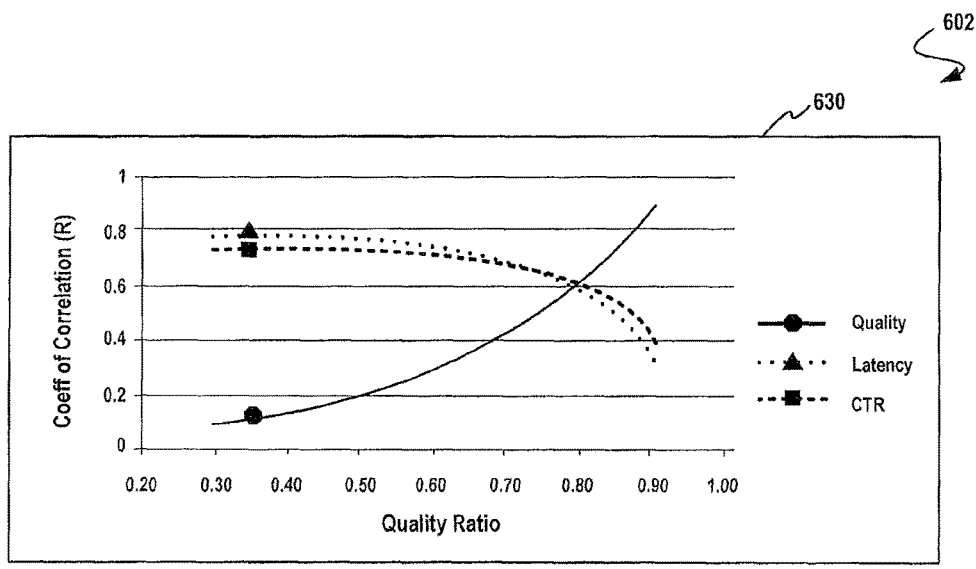
FIG. 6B depicts a plot of the coefficient of a correlation as a function of a quality ratio. depicts a plot of the coefficient of a correlation as a function of a quality ratio.

FIG. 6B depicts a plot of the coefficient of correlation as a function of a quality ratio. As shown, the curve of R (coefficient of correlation) for latency, for CTR, and for quality are plotted as the independent variable (i.e. quality ratio) is increased. The plot shown is based on adjusted weights. In this example, the weights have the following ratios:

$$W_{Quality}:W_{Latency}:W_{CTR} \text{ is as } W_{Quality}:1:4$$

and $$\text{Quality Ratio (the independent variable)} == \frac{w_{Quality}}{w_{Quality}+1.4+1}$$

To improve the correlation of latency, the weight of latency ($W_{Latency}$) was increased to 1.4 (from 1, as in the unadjusted weight ratio correlation plot 600). The correlation results for the new ratios are presented in the adjusted weight ratio correlation plot 602.

Now, when adjusted weight ratios are available, the ratios can be applied in Equation 6. That is, a system of simultaneous equations can be solved:

$$W_{Quality}/W_{Latency}=(1/1.4)$$

$$W_{Latency}/W_{CTR}=(1.4/1)$$

$$W_{Quality}/W_{CTR}=(1/1)$$

$$W_{Quality}+W_{Latency}+W_{CTR}=1$$

From these plots, final weights chosen are, Quality:Latency:CTR=0.65:0.20:0.15.

Ongoing Ranking

Based on the vendor to ad ID mapping and advertiser to ad ID mapping, the reputation scores are computed for each advertiser and/or vendor (or any other advertising network ecosystem participant, for that matter) on a periodic (e.g. weekly) basis. The periodic quality scores, security scores, technical scores, and reputation scores are computed for all the ads and are stored in a dataset (e.g. in a reputation dataset 142).

In some embodiments, sorting is performed for the purpose of ranking Table 4 shows such a ranking for vendors. Table 5 shows such a ranking for advertisers.

TABLE 4

Vendor Results for the Period of June to April 2010

| Rank | Vendor Name | Score |
|---|---|---|
| 1 | Doubleclick | 77.19 |
| 2 | Atlas DMT/Avenue | 72.30 |
| 3 | PointRoll | 66.59 |
| 4 | Eyeblaster | 64.79 |

TABLE 5

Advertiser Results for the Period of June to April 2010

| Rank | Advertiser Name | Score |
|---|---|---|
| 1 | Vegas.com, LLC | 98.19 |
| 2 | Lowes | 83.01 |
| 3 | Norwegian Cruise Lines | 81.45 |
| 4 | Focus Features | 75.00 |
| 5 | Lexus | 74.94 |
| 6 | Conagra Foods | 72.58 |
| 7 | Microsoft Headquarters | 68.09 |
| 8 | Mars Petcare U.S. | 62.17 |

Enforcement

As earlier described, an ad network server 112 can include a reputation scoring module 422, which module serves for combining a latency score, a CTR score, and a quality score to form a reputation score. In exemplary embodiments, a reputation scoring module 422 may store any/all of the measured latency, CTR, and quality data on a per-ad basis and on a periodic basis.

Rules and corresponding actions are defined with respect to such datasets (e.g. no more than a certain threshold of latency, at least a certain threshold of CTR, etc) and when a rule is violated, the actions associated with the violated rule are fired. Typical use cases would be:

1. If the user experience (e.g. latency) is flagged as consistently bad, then the ad can be taken down; or,
2. If the user flags the ad as offensive, then the ad can be sent for remedial editorial review.

More generally, consistently occurring flags over a pre-defined period (e.g. over several days, over a week, etc) can trigger notification to the third-party ad-serving system administrator. Such notification can be automatic (e.g. via sending an email to the third-party ad serving system administrator) or it can be manual, possibly involving editorial staff personnel.

Figure 7:
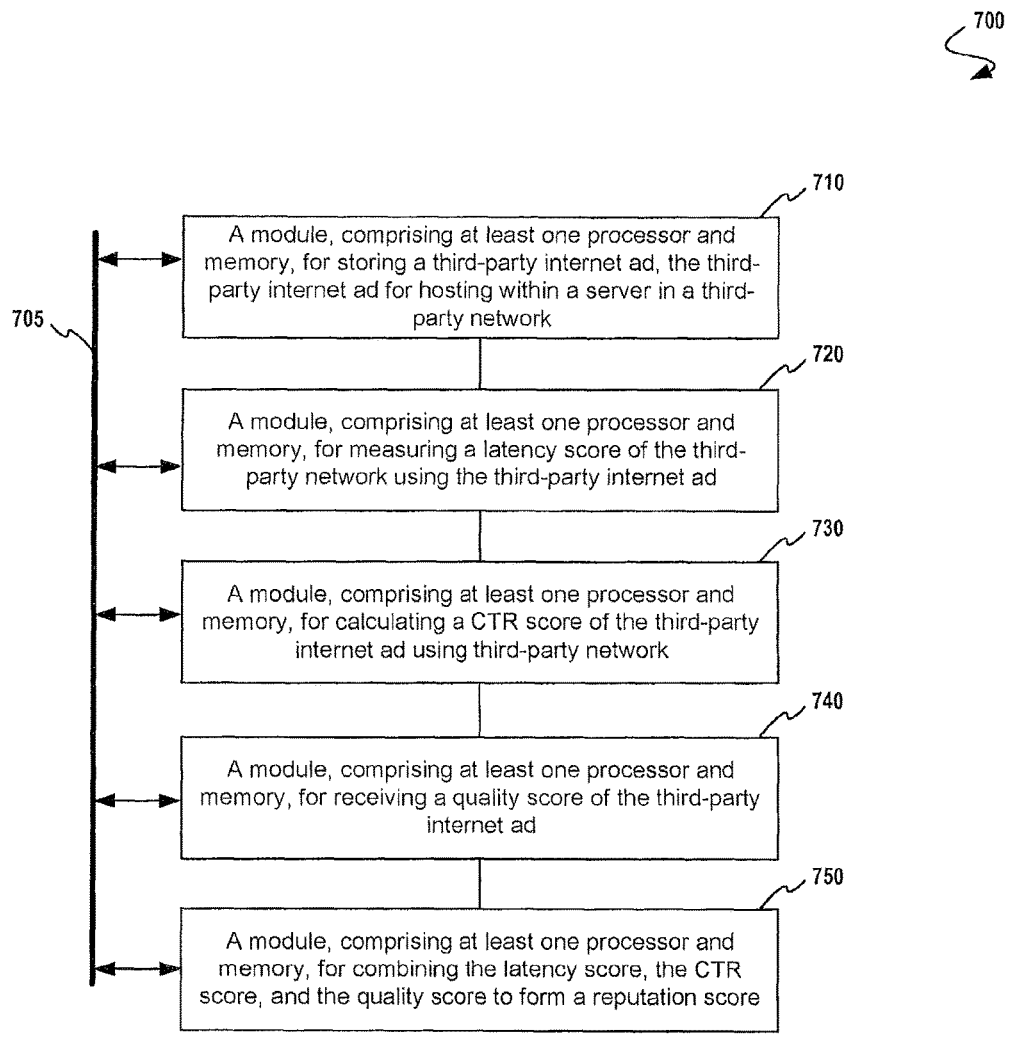
FIG. 7 depicts a block diagram of a system for ranking vendors by combining quantitative and qualitative characteristics of a third-party ad, in accordance with one embodiment.

FIG. 7 depicts a block diagram of a system for ranking vendors by combining quantitative and qualitative characteristics of a third-party ad. As an option, the present system 700 may be implemented in the context of the architecture and functionality of the embodiments described herein. Of course, however, the system 700 or any operation therein may be carried out in any desired environment. As shown, system 700 comprises a plurality of modules, a module comprising at least one processor and a memory, each connected to a communication link 705, and any module can communicate with other modules over communication link 705. The modules of the system can, individually or in combination, perform method steps within system 700. Any method steps performed within system 700 may be performed in any order unless as may be specified in the claims. As shown, system 700 implements a method for ranking vendors by combining quantitative and qualitative characteristics of a third-party ad, the system 700 comprising modules for: storing, in memory, a third-party internet ad, the third-party internet ad for hosting within a server in a third-party network (see module 710); measuring, in a computer, a latency score of the third-party network using the third-party internet ad (see module 720); calculating, in a computer, a CTR score of the third-party internet ad using third-party network (see module 730); receiving, in memory, a quality score of the third-party internet ad (see module 740); and combining, in a computer, the latency score, the CTR score, and the quality score to form a reputation score (see module 750).

Figure 8:
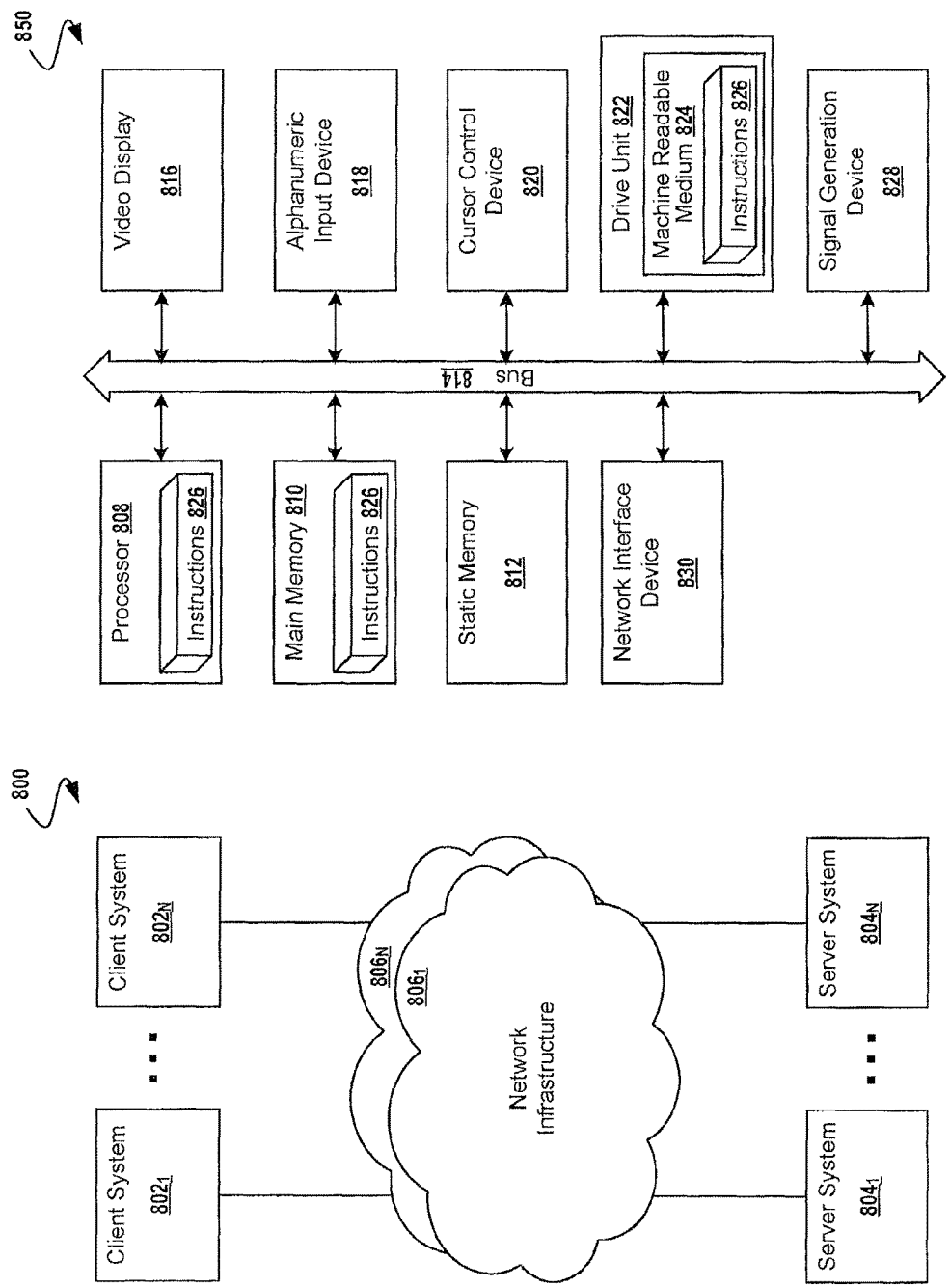
FIG. 8 depicts a diagrammatic representation of a network including nodes for client computer systems, nodes for server computer systems and nodes for network infrastructure, according to one embodiment.

FIG. 8 is a diagrammatic representation of a network 800, including nodes for client computer systems 802₁ through 802_N, nodes for server computer systems 804₁ through 804_N, and nodes for network infrastructure 806₁ through 806_N, any of which nodes may comprise a machine (e.g. computer 850) within which a set of instructions for causing the machine to perform any one of the techniques discussed above may be executed. The embodiment shown is purely exemplary, and might be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system (e.g. computer 850) includes a processor 808 (e.g. a processor core, a microprocessor, a computing device, etc), a main memory (e.g. computer memory 810), and a static memory 812, which communicate with each other via a bus 814. The computer 850 may further include a display unit (e.g. computer display 816) that may comprise a touch-screen, or a liquid crystal display (LCD), or a light emitting diode (LED) display, or a cathode ray tube (CRT). As shown, the computer system also includes a human input/output (I/O) device 818 (e.g. a keyboard, an alphanumeric keypad, etc), a pointing device 820 (e.g. a mouse, a touch screen, etc), a drive unit 822 (e.g. a disk drive unit, a CD/DVD drive, a tangible computer readable removable media drive, an SSD storage device, etc), a signal generation device 828 (e.g. a speaker, an audio output, etc), and a network interface device 830 (e.g. an Ethernet interface, a wired network interface, a wireless network interface, a propagated signal interface, etc). The drive unit 822 includes a non-transitory machine-readable medium 824 on which is stored a set of instructions (i.e. software, firmware, middleware, etc) 826 embodying any one, or all, of the methodologies described above. The set of instructions 826 is also shown to reside, completely or at least partially, within the main memory and/or within the processor 808. The set of instructions 826 may further be transmitted or received via the network interface device 830 over the network bus 814.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. An advertising computer server network comprising:
   at least one non-transitory computer-readable storage medium including a set of instructions for determining relevant advertisements for a query;
   at least one computer server processor, wherein when executing the set of instructions, the at least one computer server processor is directed to:
      obtain a latency score of an internet ad, wherein obtaining the latency score comprises:
         generating latency data by measuring time elapsing from a start of an ad call from a publisher server for the internet ad until the internet ad is fully loaded and rendered to a user by a client device, wherein the measuring of the time comprises individually measuring each of a plurality of times of a plurality of respective messages and/or operations that result in the internet ad being fully loaded and rendered to the user by the client device;
         generating an overlay by mapping the latency data onto a sigmoid scoring function or a sigmoid scoring function approximation; and
         determining the latency score based upon a characteristic of the overlay;
      obtain a CTR score of the internet ad;
      obtain a quality score of the internet ad, wherein the quality score is based on a fail ratio at which the internet ad fails at least one predetermined test;
      combine the latency score, the CTR score, and the quality score to form a reputation score for the internet ad; and
      adjust presentation of the internet ad to a user by a client device according to the reputation score.

2. The advertising computer server network of claim 1, wherein the at least one computer server processor is further directed to:
   report the reputation score,
   wherein to adjust the presentation of the internet ad the advertising computer server network removes the internet ad or sends the internet ad for remedial editorial review.

3. The advertising computer server network of claim 1, wherein the at least one computer server processor is further directed to:
   map the internet ad to a vendor.

4. The advertising computer server network of claim 1, wherein the internet ad comprises instrumentation code, and the at least one predetermined test includes at least one of security alert test, content alert test, or technical alert test.

5. The advertising computer server network of claim 1, wherein the reputation score is calculated using a coefficient of correlation for the quality score, and a coefficient of correlation for at least one of the latency score or the CTR score.

6. The advertising computer server network of claim 1, wherein at least one of the latency score or the CTR score is determined at least in part using a sigmoid scoring function.

7. The advertising computer server network of claim 1, wherein the sigmoid scoring function or the sigmoid scoring function approximation is a representation of a cumulative latency distribution for a plurality of internet ads.

8. The advertising computer server network of claim 1, wherein the characteristic of the overlay is a difference between the latency data and the sigmoid scoring function or a difference between the latency data and the sigmoid scoring function approximation.

9. A computer-implemented method for assigning a reputation score to an internet ad, the method comprising:
  obtaining, through execution by a computer of instructions stored on a non-transitory computer-readable storage medium, a latency score of the internet ad, wherein obtaining the latency score comprises:
    generating latency data by measuring time elapsing from a start of an ad call from a publisher server for the internet ad until the internet ad is fully loaded and rendered to a user by a client device, wherein the measuring of the time comprises individually measuring each of a plurality of times of a plurality of respective messages and/or operations that result in the internet ad being fully loaded and rendered to the user by the client device;
    generating an overlay by mapping the latency data onto a sigmoid scoring function or a sigmoid scoring function approximation; and
    determining the latency score based upon a characteristic of the overlay;
  obtaining, through execution by a computer of instructions stored on a non-transitory computer-readable storage medium, a CTR score of the internet ad;
  obtaining, through execution by a computer of instructions stored on a non-transitory computer-readable storage medium, a quality score of the internet ad, wherein the quality score is based on a fail ratio at which the internet ad fails 44 at least one predetermined test;
  combining, through execution by a computer of instructions stored on a non-transitory computer-readable storage medium, the latency score, the CTR score, and the quality score to form a reputation score for the internet ad; and
  adjusting, through execution by a computer of instructions stored on a non-transitory computer-readable storage medium, presentation of the internet ad to a user by a client device according to the reputation score.

10. The method of claim 9, further comprising: reporting the reputation score,
  wherein the adjusting of the internet ad comprises removing the internet ad or conducting remedial editorial review of the internet ad.

11. The method of claim 9, wherein the internet ad comprises instrumentation code, and the at least one predetermined test includes at least one of security alert test, content alert test, or technical alert test.

12. The method of claim 9, wherein the reputation score is calculated using a coefficient of correlation for the quality score, and a coefficient of correlation for at least one of the latency score or the CTR score.

13. The method of claim 9, wherein at least one of the latency score or the CTR score is determined at least in part using a sigmoid scoring function.

14. The method of claim 9, wherein at least one of the latency score or the CTR score is determined at least in part using a linearized scoring function.

15. A non-transitory computer readable medium comprising a set of instructions for assigning a reputation score to an internet ad, the set of instructions configured to, when executed by a processor, direct the processor to perform acts of:
  obtaining a latency score of the internet ad, wherein obtaining the latency score comprises:
    generating latency data by measuring time elapsing from a start of an ad call from a publisher server for the internet ad until the internet ad is fully loaded and rendered to a user by a client device, wherein the measuring of the time comprises individually measuring each of a plurality of times of a plurality of respective messages and/or operations that result in the internet ad being fully loaded and rendered to the user by the client device;
    generating an overlay by mapping the latency data onto a sigmoid scoring function or a sigmoid scoring function approximation; and
    determining the latency score based upon a characteristic of the overlay;
  obtaining a CTR score of the internet ad;
  obtaining a quality score of the internet ad, wherein the quality score is based on a fail ratio at which the internet ad fails at least one predetermined test;
  combining the latency score, the CTR score, and the quality score to form a reputation score for the internet ad; and
  adjusting presentation of the internet ad to a user by a client device according to the reputation score.

16. The non-transitory computer readable medium of claim 15, further comprising a set of instructions to direct a processor to perform acts of:
  reporting the reputation score, wherein the adjusting of the internet ad comprises removing the internet ad or conducting remedial editorial review of the internet ad.

17. The non-transitory computer readable medium of claim 15, wherein the internet ad comprises instrumentation code, and the at least one predetermined test includes at least one of security alert test, content alert test, or technical alert test.

18. The non-transitory computer readable medium of claim 15, wherein the reputation score is calculated using a coefficient of correlation for the quality score, and a coefficient of correlation for at least one of the latency score or the CTR score.

19. The non-transitory computer readable medium of claim 15, wherein at least one of the latency score or the CTR score is determined at least in part using a sigmoid scoring function.

20. The non-transitory computer readable medium of claim 15, wherein at least one of the latency score or the CTR score is determined at least in part using a linearized scoring function.

* * * * *